United States Patent
Sato

(10) Patent No.: US 8,817,982 B2
(45) Date of Patent: Aug. 26, 2014

(54) IMAGE FORMING APPARATUS

(75) Inventor: Kimitoshi Sato, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1591 days.

(21) Appl. No.: 12/068,981

(22) Filed: Feb. 14, 2008

(65) Prior Publication Data
US 2008/0212772 A1 Sep. 4, 2008

(30) Foreign Application Priority Data
Mar. 2, 2007 (JP) ................ 2007-052914

(51) Int. Cl.
G09C 3/00 (2006.01)
G06F 11/30 (2006.01)
H04L 9/14 (2006.01)

(52) U.S. Cl.
CPC .................... H04L 9/14 (2013.01)
USPC .......................... 380/54; 713/189

(58) Field of Classification Search
USPC ............. 380/54, 210, 28, 29; 713/167, 189; 382/100
See application file for complete search history.

(56) References Cited

U.S. PATENT DOCUMENTS

| | | | | |
|---|---|---|---|---|
| 7,124,094 B1 * | 10/2006 | Kobayashi et al. | ............. | 705/64 |
| 7,237,120 B1 * | 6/2007 | Lang et al. | ............. | 713/187 |
| 7,519,830 B2 * | 4/2009 | Mihm et al. | ............. | 713/187 |
| 7,769,164 B2 * | 8/2010 | Asano | ............. | 380/28 |
| 8,275,128 B2 * | 9/2012 | Nakagoe et al. | ............. | 380/29 |
| 2002/0036790 A1 * | 3/2002 | Nishiyama | ............. | 358/1.14 |
| 2005/0180564 A1 * | 8/2005 | Asano | ............. | 380/28 |
| 2005/0249348 A1 * | 11/2005 | Fujimoto et al. | ............. | 380/28 |
| 2006/0012828 A1 * | 1/2006 | Ohta | ............. | 358/1.18 |
| 2006/0050879 A1 * | 3/2006 | Iizuka | ............. | 380/51 |
| 2006/0062383 A1 * | 3/2006 | Kaneda et al. | ............. | 380/28 |
| 2006/0242418 A1 * | 10/2006 | Willamowski et al. | ............. | 713/176 |
| 2006/0279768 A1 * | 12/2006 | Wang et al. | ............. | 358/1.15 |
| 2006/0279773 A1 * | 12/2006 | Sakurai et al. | ............. | 358/1.15 |
| 2007/0076867 A1 * | 4/2007 | Yeung et al. | ............. | 380/43 |
| 2008/0089554 A1 * | 4/2008 | Tabankin et al. | ............. | 382/100 |
| 2008/0267402 A1 * | 10/2008 | Kimura | ............. | 380/243 |

FOREIGN PATENT DOCUMENTS

JP 11-215356 8/1999

* cited by examiner

*Primary Examiner* — Farid Homayounmehr
*Assistant Examiner* — Abu Sholeman
(74) *Attorney, Agent, or Firm* — Kubotera & Associates, LLC

(57) ABSTRACT

An image forming apparatus includes a receiving unit for receiving data encrypted with a first encryption method and sent from a host device; a decryption unit for decrypting the data thus encrypted; an embedded data generation unit for re-editing the data thus decrypted to generate embedded information; an embedded information encryption unit for encrypting the embedded information with a second encryption method; and an image forming unit for forming the embedded information thus encrypted on a medium as a base emblem pattern.

11 Claims, 23 Drawing Sheets

IMAGE FORMING APPARATUS

BACKGROUND OF THE INVENTION AND RELATED ART STATEMENT

The present invention relates to an image forming apparatus.

Patent Reference has proposed a conventional apparatus, in which specific information is embedded in text data as an electric watermark, thereby preventing important text data from leaking.

Patent Reference: Japanese Patent Publication No. 11-215356

In the conventional apparatus, when specific information to be embedded is sent in a plain text from a host device to a printer as additional information relative to a print job, the specific information may be easily fabricated or falsified.

In the view of the problems described above, an object of the present invention is to provide an image forming apparatus capable of solving the problems of the conventional apparatus. In the image forming apparatus of the present invention, when a host device sends encrypted data, the encrypted data are re-edited to generate embedded information. The embedded information is formed on a medium as a base emblem pattern. Accordingly, it is possible to encrypt and decrypt data in a short period of time, and to prevent data from being peeked, fabricated, or falsified by a third party.

Further objects and advantages of the invention will be apparent from the following description of the invention.

SUMMARY OF THE INVENTION

In order to attain the objects described above, according to the present invention, an image forming apparatus includes a receiving unit for receiving data encrypted with a first encryption method and sent from a host device; a decryption unit for decrypting the data thus encrypted; an embedded data generation unit for re-editing the data thus decrypted to generate embedded information; an embedded information encryption unit for encrypting the embedded information with a second encryption method; and an image forming unit for forming the embedded information thus encrypted on a medium as a base emblem pattern.

In the image forming apparatus of the present invention, the encrypted data sent from the host device is re-edited to the embedded information, and the embedded information is formed on the medium as the base emblem pattern. Accordingly, it is possible to reduce a time for encryption and decryption of the data, and to prevent a third party from peeking, modifying, or impersonating with respect to the data.

DETAILED DESCRIPTION OF THE PREFERRED EMBODIMENTS

Hereunder, embodiments of the present invention will be explained with reference to the accompanying drawings.

First Embodiment

Figure 1:
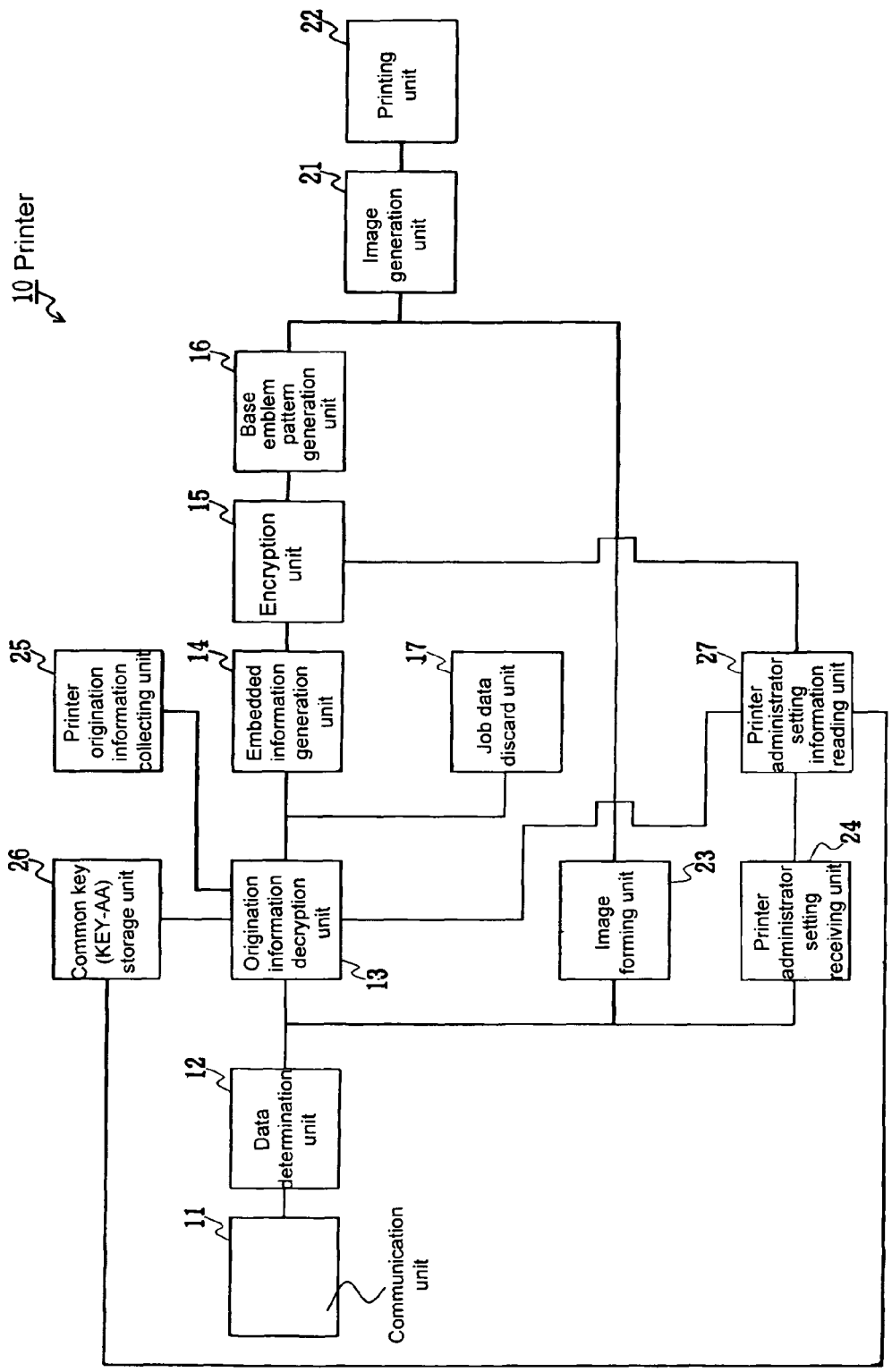
FIG. 1 is a block diagram showing a configuration of a printer according to a first embodiment of the present invention.
Figure 2:
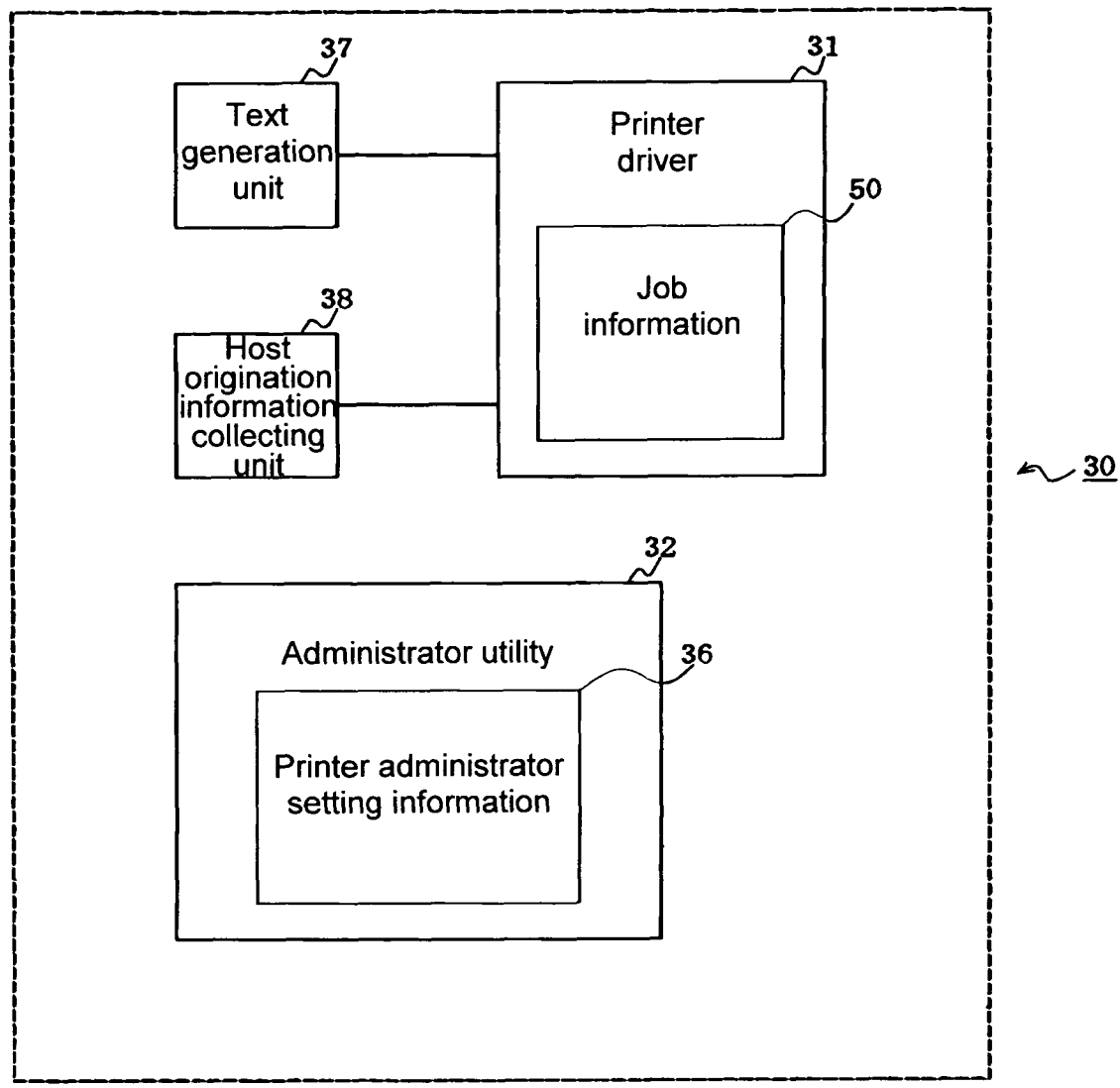
FIG. 2 is a block diagram showing a configuration of a host device according to the first embodiment of the present invention.
Figure 3:
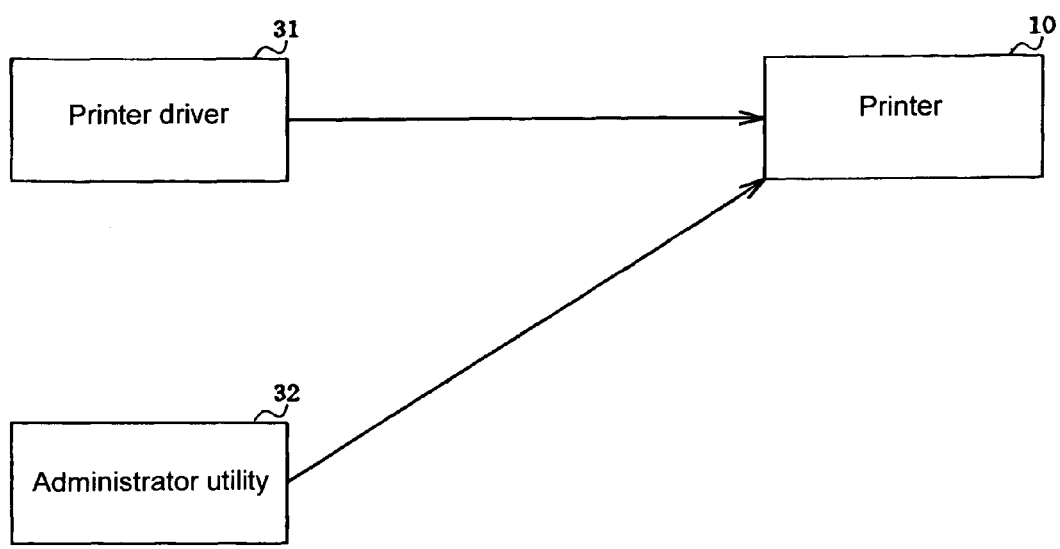
FIG. 3 is a block diagram showing a configuration of a system according to the first embodiment of the present invention.
Figure 4:
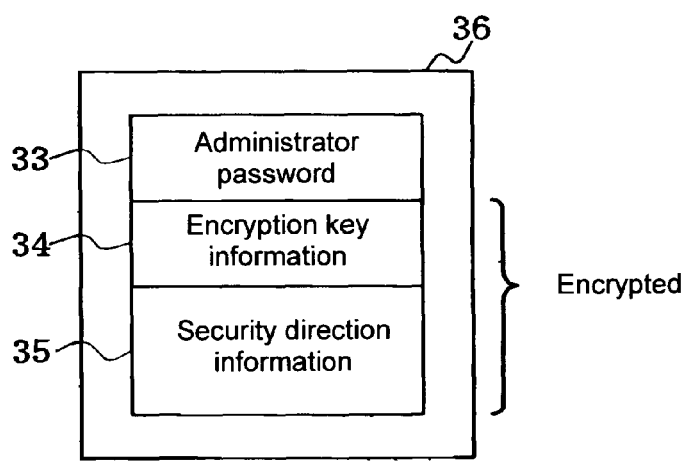
FIG. 4 is a schematic view showing a configuration of printer administrator setting information according to the first embodiment of the present invention.

A first embodiment of the present invention will be explained. FIG. 1 is a block diagram showing a configuration of a printer 10 according to a first embodiment of the present invention. FIG. 2 is a block diagram showing a configuration of a host device 30 according to the first embodiment of the present invention. FIG. 3 is a block diagram showing a configuration of a system according to the first embodiment of the present invention. FIG. 4 is a schematic view showing a configuration of printer administrator setting information 36 according to the first embodiment of the present invention.

Figure 5:
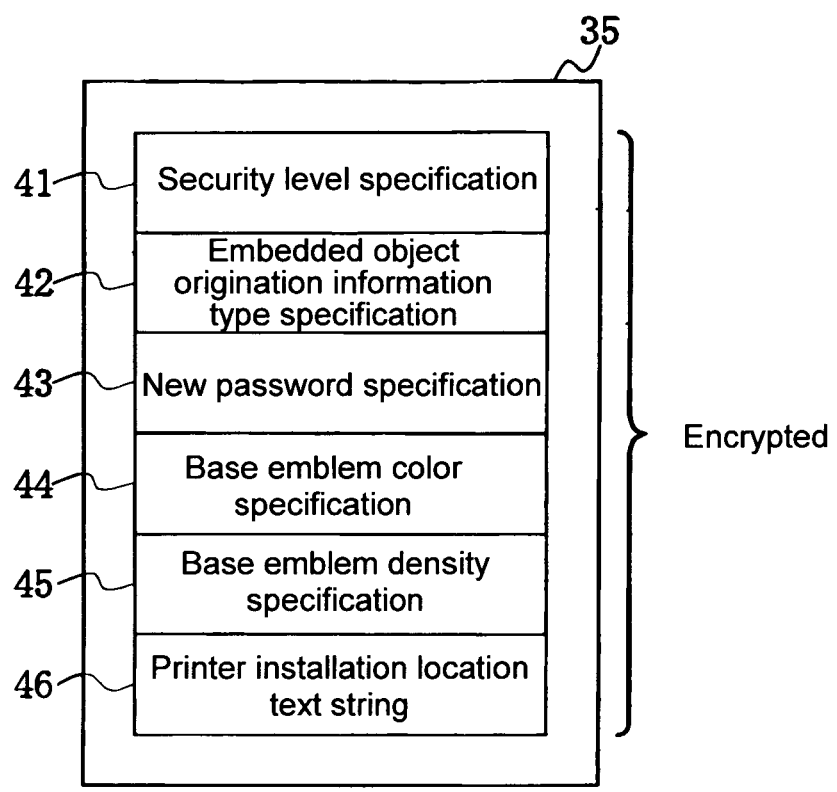
FIG. 5 is a schematic view showing a configuration of security direction information according to the first embodiment of the present invention.
Figure 6:
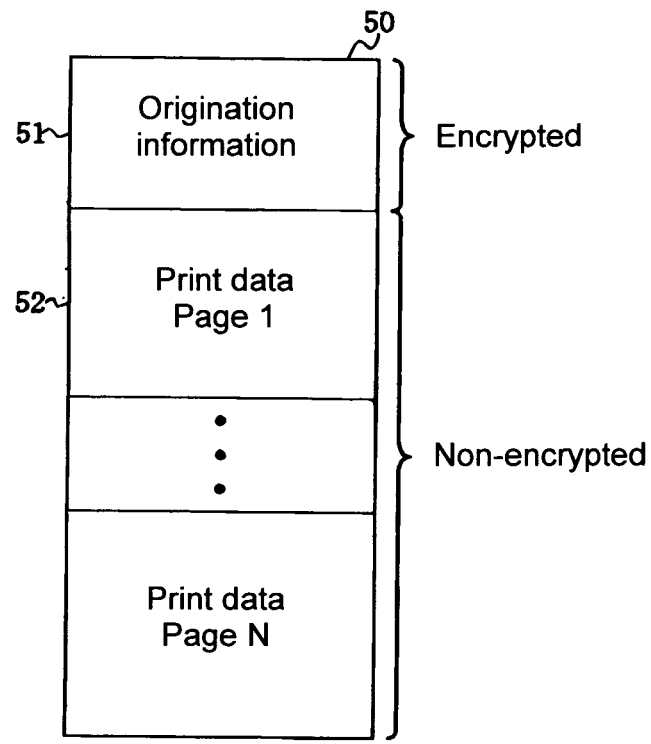
FIG. 6 is a schematic view showing a configuration of job information according to the first embodiment of the present invention.
Figure 7:
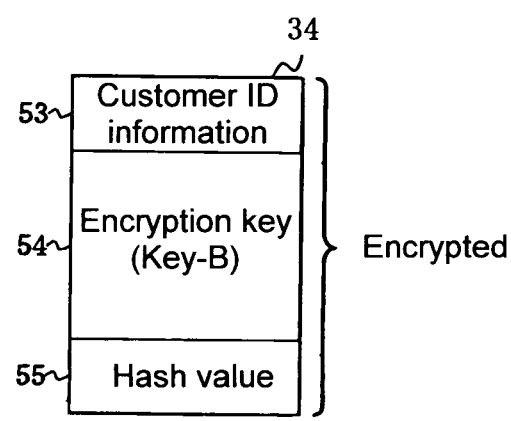
FIG. 7 is a schematic view showing a configuration of encryption key information according to the first embodiment of the present invention.
Figure 8:
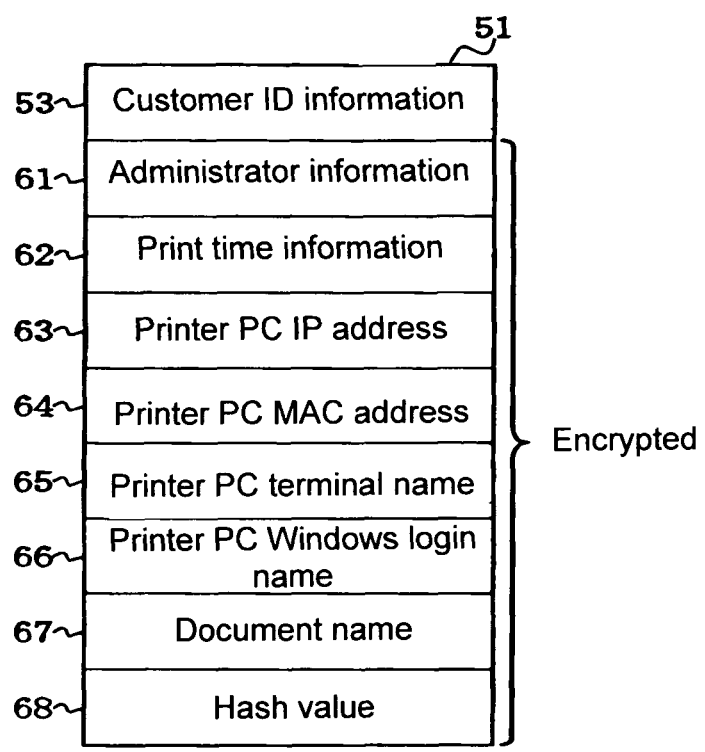
FIG. 8 is a schematic view showing a configuration of origination information according to the first embodiment of the present invention.
Figure 9:
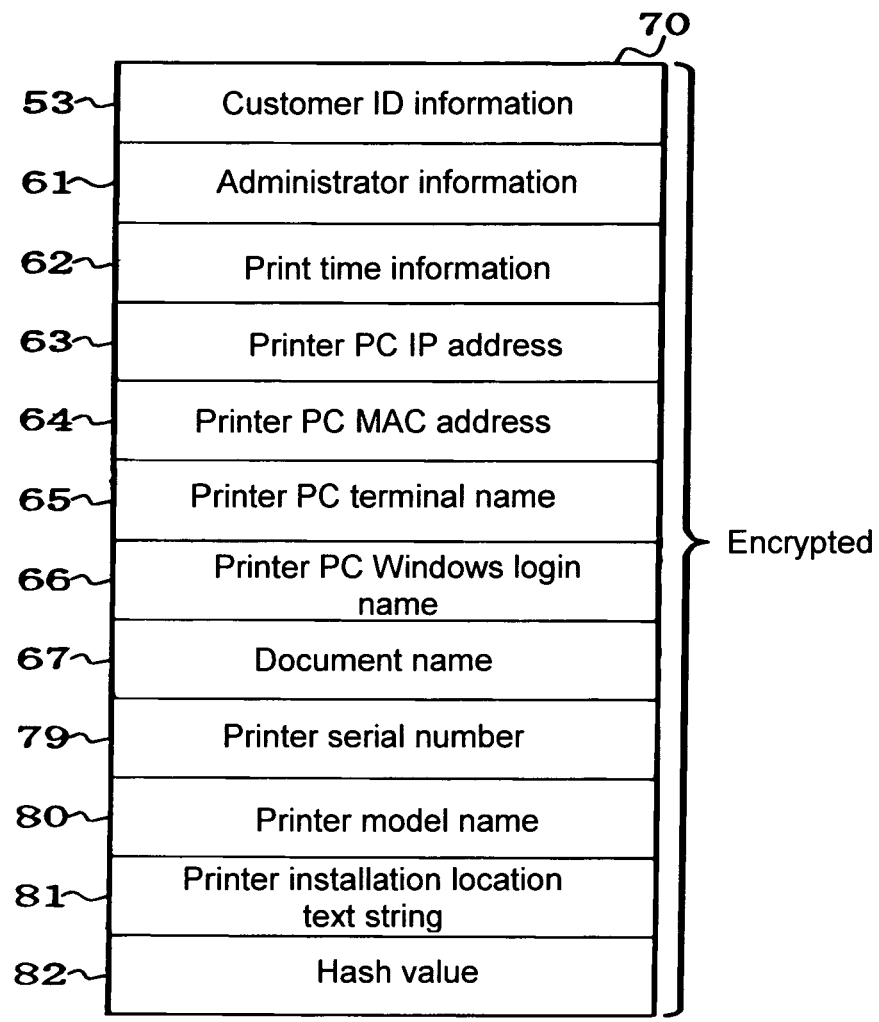
FIG. 9 is a schematic view showing a configuration of embedded information according to the first embodiment of the present invention.

Further, FIG. 5 is a schematic view showing a configuration of security direction information 35 according to the first embodiment of the present invention. FIG. 6 is a schematic view showing a configuration of job information 50 according to the first embodiment of the present invention. FIG. 7 is a schematic view showing a configuration of encryption key information 34 according to the first embodiment of the present invention. FIG. 8 is a schematic view showing a configuration of origination information 51 according to the first embodiment of the present invention. FIG. 9 is a schematic view showing a configuration of embedded information 70 according to the first embodiment of the present invention.

In the embodiment, the printer 10 shown in FIG. 1 as an image forming apparatus may be any type of printers such as an ink-jet type, an electro-photography type, and a thermal transfer type. As shown in FIG. 2, the printer 10 is connected to the host device 30 capable of communicating therewith. The host device 30 may be any type of apparatus capable of generating data such as print data in the printer 10.

In the embodiment, the printer 10 includes a communication unit 11; a data determination unit 12; an origination information decryption unit 13; an embedded information generation unit 14; an encryption unit 15; a base emblem pattern generation unit 16; a job data discard unit 17; an image generation unit 21; a printing unit 22; an image forming unit 23; a printer administrator setting receiving unit 24; a printer origination information collecting unit 25; a common key (KEY-A) storage unit 26; and a printer administrator setting information reading unit 27.

In the embodiment, the host device 30 includes a printer driver 31 for generating the job information 50; an administrator utility 32 for generating the printer administrator setting information 36; a text generation unit 37 for generating a text; and a host origination information collecting unit 38. As shown in FIG. 3, the printer driver 31 and the administrator utility 32 send the job information 50 and the printer administrator setting information 36 to the printer 10, respectively.

As shown in FIG. 6, the job information 50 includes the origination information 51 and print data 52. The print data 52 are data written per single page with a page description language. The job information 50 may include a plurality of the print data 52. The origination information 51 is data encrypted with a first encryption method, and the print data 52 are data not encrypted.

As shown in FIG. 8, the origination information 51 includes customer ID information 53; administrator information 61; print time information 62; a printer PC IP address 63; a printer PC MAC address 64; a printer PC terminal name 65; a printer PC Windows login name 66; a document name 67; and a hash value 68. In the origination information 51, a portion from the administrator information 61 to the hash value 68 is encrypted. The customer ID information 53 includes a common ID designated to a company using the printer 10, a department of the company, and the likes. In all of the printers 10 used in the company and the department thereof use the common ID as the customer ID information 53.

As shown in FIG. 4, the printer administrator setting information 36 includes an administrator password 33; the encryption key information 34; and the security direction information 35. The encryption key information 34 and the security direction information 35 are data encrypted with an encryption key KEY-A.

As shown in FIG. 7, the encryption key information 34 includes the customer ID information 53; an encryption key (KEY-B) 54; and a hash value 55. Further, the encryption key information 34 is encrypted with the encryption key KEY-A, i.e., a common key between the administrator utility 32 and the printer 10. The encryption key 54 or KEY-B is an encryption key used for a second encryption method, and is encrypted with a third encryption method. The hash value 55 includes a result of a hash calculation of the customer ID information 53 and the encryption key 54 before encryption. Further, the hash value 55 is used for data check or hash check after decryption.

As shown in FIG. 5, the security direction information 35 includes a security level specification 41; an embedded object origination information type specification 42; a new password specification 43; a base emblem color specification 44; a base emblem density specification 45; and a printer installation location text string 46.

In the embodiment, when a high level security is required, the security level specification 41 exhibits a high value. When a low level security is required, the security level specification 41 exhibits a low value. For example, when a level value of the security level specification 41 is zero, a base emblem pattern (described later) is not generated. When the level value of the security level specification 41 is high, the base emblem pattern including other types of information is generated.

In the embodiment, the embedded object origination information type specification 42 corresponds to the security level specification 41. When the level value is high, a large number of origination information types are specified as an embedded object. With the new password specification 43, an administrator regularly uses the administrator utility 32 to update a password for security reasons. Note that the security direction information 35 is not necessarily encrypted.

In the embodiment, the communication unit 11 functions as a receiving unit for receiving the job information 50 and the printer administrator setting information 36 sent from the printer driver 31 and the administrator utility 32 of the host device 30. Further, the data determination unit 12 determines the print data 52 and the printer administrator setting information 36 included in the job information 50 received at the communication unit 11.

In the embodiment, the origination information decryption unit 13 functions as a decryption unit for decrypting the origination information 51 thus encrypted using the common key KEY-A stored in the common key storage unit 26. Accordingly, the embedded information generation unit 14 retrieves information directed at the printer administrator setting information 36 according to the origination information 51 thus decrypted and origination information of the printer 10 collected with the printer origination information collecting unit 25, thereby generating the embedded information 70.

In the embodiment, the encryption unit 15 functions as an embedded information encryption unit for encrypting the embedded information 70 with the second encryption method, thereby obtaining the embedded information 70 thus encrypted as shown in FIG. 9.

In the embodiment, the embedded information 70 includes the customer ID information 53; the administrator information 61; the print time information 62; the printer PC IP address 63 of the host device 30; the printer PC MAC address 64; the printer PC terminal name 65; the printer PC Windows login name 66; the document name 67; a printer serial number 79; a printer model name 80; a printer installation location text string 81; and a hash value 82.

In the embodiment, the encryption unit 15 uses the key encrypted in the printer administrator setting information 36 for encrypting the embedded information 70, and may encrypt the embedded information 70 without using the administrator utility 32. Further, the base emblem pattern generation unit 16 converts the embedded information 70 thus encrypted into a base emblem pattern. Still further, the job data discard unit 17 is operated to discard the job information 50 when the origination information 51 decrypted with the origination information decryption unit 13 has an error.

In the embodiment, the image forming unit 23 generates an print image according to the print data 52. Further, the image generation unit 21 combines the base emblem pattern generated with the base emblem pattern generation unit 16 and the print image generated with the image forming unit 23, thereby generating a base emblem combined print image. Note that it is possible to generate the base emblem pattern using technology called Val-CODE® developed by Oki Electric Industry Co., Ltd. Afterward, the printing unit 22 prints the base emblem combined print image on a sheet.

In the embodiment, the printer administrator setting receiving unit 24 receives the printer administrator setting information 36 from the data determination unit 12. Further, the printer administrator setting information reading unit 27 decrypts the printer administrator setting information 36 using the common key KEY-A stored in the common key storage unit 26. Still further, the printer origination information collecting unit 25 collects information related to an origination of the printer 10 such as the printer serial number 79, the printer model name 80, the printer installation location text string 81, and the likes.

Figure 10:
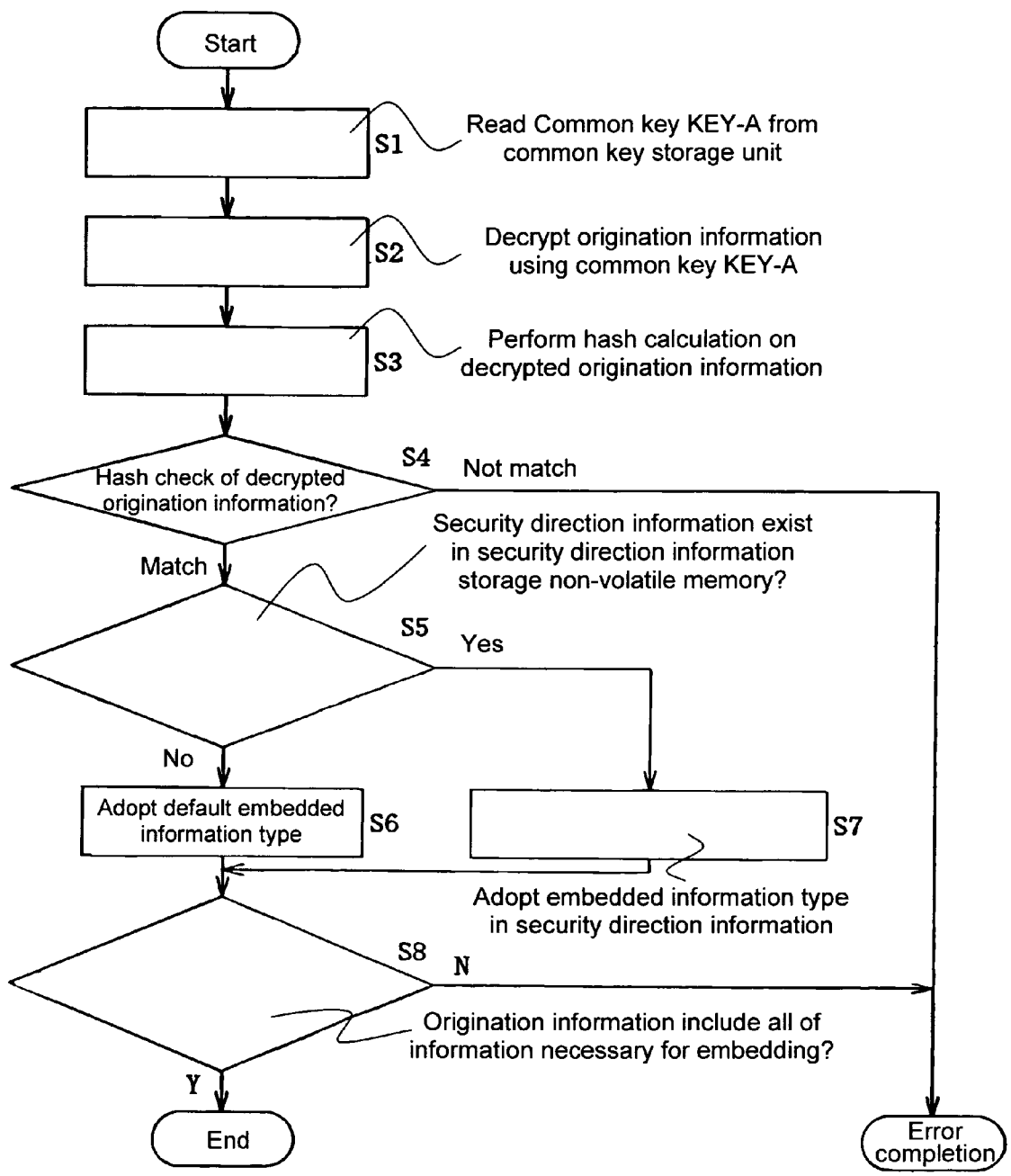
FIG. 10 is a flowchart showing an operation of an origination information decryption unit of the printer according to the first embodiment of the present invention.

An operation of the printer 10 will be explained next. First, an operation of the origination information decryption unit 13 will be explained. FIG. 10 is a flowchart showing the operation of the origination information decryption unit 13 of the printer 10 according to the first embodiment of the present invention.

First, the origination information decryption unit 13 reads the common key KEY-A from the common key storage unit 26, and decrypts the origination information 51 using the common key KEY-A. Note that the common key KEY-A is a cryptography key KEY-A of a symmetrical cryptography type stored in the printer 10 in advance. The common key KEY-A is used for information communicating between the printer 10 and the host device 30 and having a high level of security (portion). The cryptography key includes an encryption key and a decryption key.

In the embodiment, the cryptography key KEY-A is used as the common key among the printer 10, the printer driver 31, and the administrator utility 32. The cryptography type is 3DES (triple DES), i.e., a secret key type of a symmetrical cryptography developed by IBM. In the symmetrical cryptography, a transmitting side performs encryption using a key, and a receiving side performs decryption using the same key as the common key. Accordingly, in the decryption, the receiving side performs a reverse conversion process symmetrical to a conversion process in the encryption.

When the printer driver 31 generates the job information 50 shown in FIG. 6, the printer driver 31 uses the cryptography key KEY-A as the common key to encrypt the origination information 51 according to the 3DES. Note that the print data 52 written in a page description language are not encrypted.

In the next step, the origination information decryption unit 13 performs a hash calculation of the origination information 51 thus decrypted. The hash calculation is performed using a SHA-1 hash function over a range from the administrator information 61 to the document name 67 in the origination information 51. The SHA-1 hash function generates a hash value of 160 bit from an original text of $2^{64}$ bit.

In the next step, the origination information decryption unit 13 performs the hash check on the origination information 51 thus decrypted, and compares the hash value generated in the hash function with the hash value 68 included in the origination information 51 to determine whether the hash value matches to the hash value 68. When the hash value does not match to the hash value 68, the origination information decryption unit 13 determines falsification and performs error return or error completion. When the hash value matches to the hash value 68, the origination information decryption unit 13 determines that the origination information 51 is proper and continues the process.

In the next step, it is determined whether the security direction information 35 exists in a security direction information storage non-volatile memory (not shown). Note that the security direction information 35 is data included in the printer administrator setting information 36 sent from the administrator utility 32 to the printer 10. Further, the security direction information 35 includes information necessary for generating the base emblem pattern such as the security level specification 41, the embedded object origination information type specification 42, and the likes.

When the security direction information 35 does not exist in the security direction information storage non-volatile memory (not shown), the process does not proceed to a next step. Accordingly, when the security direction information 35 does not exist in the security direction information storage non-volatile memory (not shown), that is, when the security direction information 35 is not sent from the administrator utility 32 to the printer 10, and the printer administrator setting information 36 received at the printer administrator setting receiving unit 24 is not decrypted and stored, the origination information decryption unit 13 adopts a default embedded information type stored in a printer program. In this case, the default embedded information type is generated according to the origination information 51 thus decrypted and the information related to origination of the printer 10.

In the next step, the origination information decryption unit 13 determines whether the origination information 51 includes all of the information necessary for embedding, that is, there is sufficient information necessary for embedding.

When there is not sufficient information necessary for embedding, the origination information decryption unit 13 performs the error return or the error completion. When there is sufficient information necessary for embedding, the origination information decryption unit 13 completes the process normally.

The flowchart shown in FIG. 10 will be explained next. In step S1, the common key KEY-A is read from the common key storage unit 26. In step S2, the origination information 51 is decrypted using the common key KEY-A. In step S3, the hash calculation is performed on the origination information 51 thus decrypted. In step S4, the hash check is performed on the origination information 51 thus decrypted to determine whether the hash value matches to the hash value 68. When the hash value matches to the hash value 68, the process proceeds to step S5. When the hash value does not match to the hash value 68, the error completion is performed.

In step S5, it is determined whether the security direction information 35 exists in the security direction information storage non-volatile memory. When the security direction information 35 exists in the security direction information storage non-volatile memory, the process proceeds to step S7. When the security direction information 35 does not exist in the security direction information storage non-volatile memory, the process proceeds to step S6.

In step S6, the default embedded information type is adopted. In step S7, the embedded information type in the security direction information 35 is adopted. In step S8, it is determined whether the origination information 51 includes all of the information necessary for embedding. When the origination information 51 includes all of the information necessary for embedding, the process is completed. When the origination information 51 does not include all of the information necessary for embedding, the error completion is performed.

Figure 11:
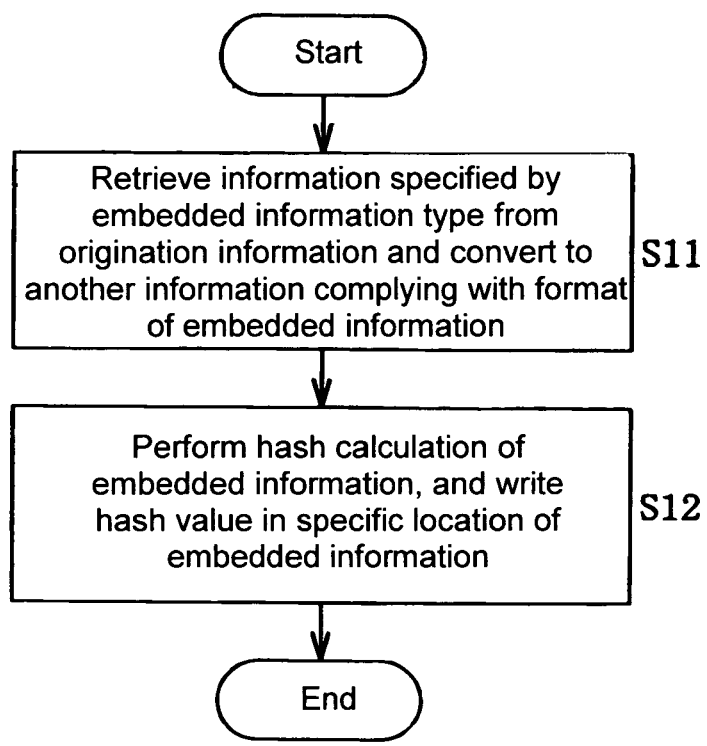
FIG. 11 is a flowchart showing an operation of an embedded information generation unit of the printer according to the first embodiment of the present invention.

An operation of the embedded information generation unit 14 will be explained next. FIG. 11 is a flowchart showing the operation of the embedded information generation unit 14 of the printer 10 according to the first embodiment of the present invention.

First, the embedded information generation unit 14 retrieves information specified by the embedded information type from the origination information 51, and converts the information to another information complying with a format of the embedded information 70, thereby generating the embedded information 70. In the next step, the embedded information generation unit 14 performs a hash calculation of the embedded information 70 thus generated. Then, the embedded information generation unit 14 writes a hash value thus calculated in a specific location of the embedded information 70 as the hash value 82, thereby completing the process.

The flowchart shown in FIG. 11 will be explained next. In step S11, the information specified by the embedded information type is retrieved from the origination information 51, and the information is converted to another information complying with the format of the embedded information 70. In step S12, the hash calculation of the embedded information 70 thus generated is performed, and the hash value 82 is written in the specific location of the embedded information 70, thereby completing the process.

Figure 12:
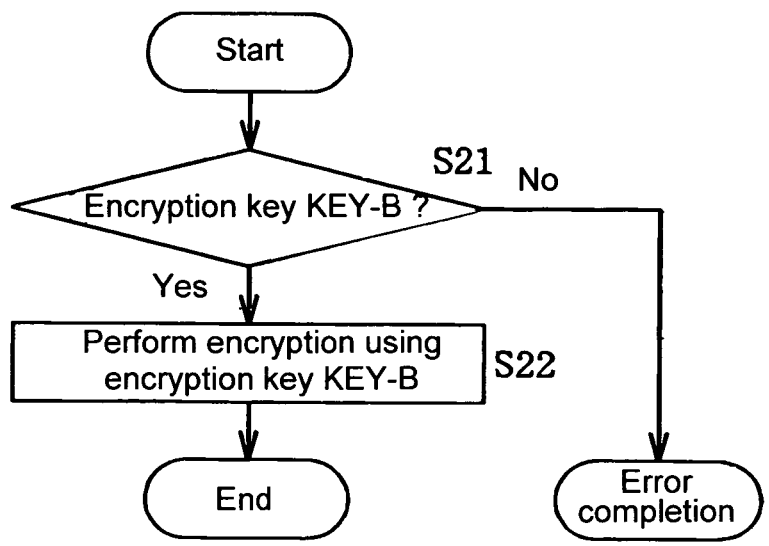
FIG. 12 is a flowchart showing an operation of an encryption unit of the printer according to the first embodiment of the present invention.

An operation of the encryption unit 15 will be explained next. FIG. 12 is a flowchart showing the operation of the encryption unit 15 of the printer 10 according to the first embodiment of the present invention.

In the embodiment, the encryption unit 15 encrypts the embedded information 70 generated with the embedded information generation unit 14. In this case, the embedded information 70 is encrypted using the encryption key 54 in the encryption key information 34 included in the printer administrator setting information 36. Note that the encryption key 54 is KEY-B, not KEY-A. Further, the 3DES is used as the cryptography type.

First, the encryption unit 15 determines whether there is the encryption key 54. When there is not the encryption key 54, the encryption unit 15 performs the error return or the error completion. When there is the encryption key 54, the encryption unit 15 encrypts the encryption key 54, thereby completing the process.

In the next step, the base emblem pattern generation unit 16 converts the embedded information 70 thus encrypted to the base emblem pattern. Further, the image generation unit 21 combines the print image generated with the image forming unit 23 using the print data 52 as an input and the base emblem pattern generated with the base emblem pattern generation unit 16, so that the printing unit 22 performs the printing operation.

The flowchart shown in FIG. 12 will be explained next. In step S21, it is determined whether there is the encryption key KEY-B. When there is the encryption key KEY-B, the process proceeds to step S22. When there is not the encryption key KEY-B, the process is completed. In step S22, the encryption is performed using the encryption key KEY-B, thereby completing the process.

Figure 13:
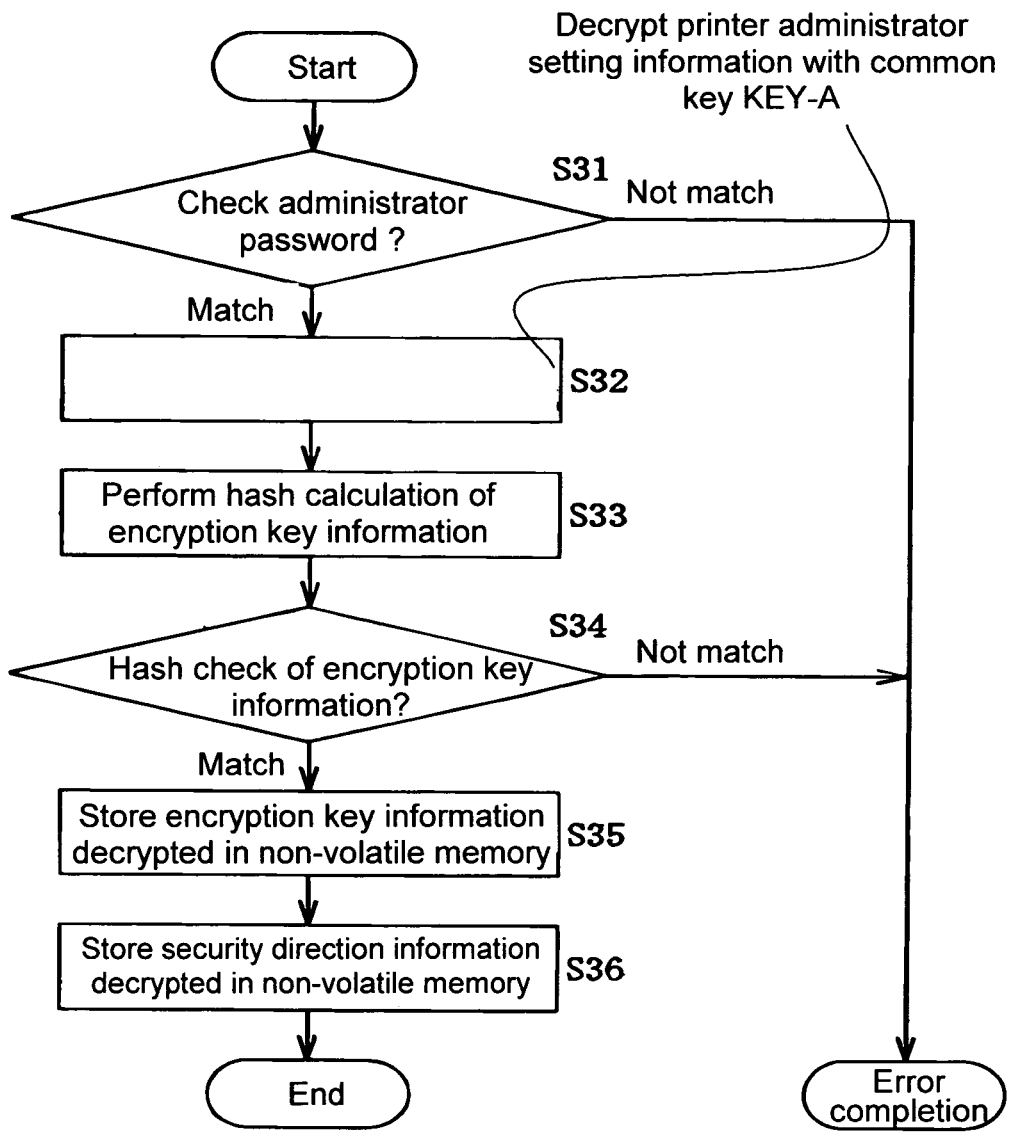
FIG. 13 is a flowchart showing an operation of a printer administrator setting receiving unit of the printer according to the first embodiment of the present invention.

An operation of the printer administrator setting receiving unit 24 will be explained next. FIG. 13 is a flowchart showing the operation of the printer administrator setting receiving unit 24 of the printer 10 according to the first embodiment of the present invention.

First, the printer administrator setting receiving unit 24 checks the administrator password 33 of the printer administrator setting information 36 received from the data determination unit 12, and determines whether the administrator password 33 matches to an administrator password provided in the printer 10. When the administrator password 33 does not match to the administrator password, the printer administrator setting receiving unit 24 performs the error return or the error completion. When the administrator password 33 matches to the administrator password, the printer administrator setting receiving unit 24 decrypts the printer administrator setting information 36 using the common key or encryption key KEY-A. In this case, the printer administrator setting receiving unit 24 decrypts the encryption key information 34 and the security direction information 35 of the printer administrator setting information 36.

As described above, the encryption key information 34 includes the customer ID information 53, the encryption key 54, and the hash value 55. Further, the customer ID information 53, the encryption key 54, and the hash value 55 are encrypted using the common key or encryption key KEY-A according to the 3DES. Note that the encryption key 54 is an encryption key of the 3DES, and is used at the encryption unit 15 for encrypting the embedded information 70.

In the next step, the printer administrator setting receiving unit 24 performs the hash calculation of the encryption key information 34. The hash calculation is performed over a range from the customer ID information 53 to an end of the encryption key 54 in the encryption key information 34 to generate a hash value using the SHA-1 hash function.

In the next step, the printer administrator setting receiving unit 24 performs the hash check on the encryption key information 34, and compares the hash value generated in the hash function with the hash value 55 included in the encryption key information 34 to determine whether the hash value matches to the hash value 55. When the hash value does not match to the hash value 55, the printer administrator setting receiving unit 24 performs the error return or the error completion. When the hash value matches to the hash value 55, the printer administrator setting receiving unit 24 determines that the origination information 51 is proper and continues the process.

In the next step, the security direction information 35 thus decrypted is stored in a non-volatile memory (not shown) such as a flash memory provided in the printer 10. Note that the encryption key 54 included in the security direction information 35 is the KEY-B. Further, the encryption key information 34 thus decrypted is stored in the non-volatile memory, so that the encryption key information 34 is not erased when power is turned off. Afterward, the printer administrator setting receiving unit 24 stores the security direction information 35 thus decrypted in a non-volatile memory provided in the printer 10, thereby completing the process.

The flowchart shown in FIG. 13 will be explained next. In step S31, the administrator password is checked to determine whether the administrator password 33 matches to the administrator password provided in the printer 10. When the administrator password 33 matches to the administrator password provided in the printer 10, the process proceeds to step S32. When the administrator password 33 does not match to the administrator password provided in the printer 10, the error completion is performed.

In step S32, the printer administrator setting information 36 thus received is decrypted with the common key KEY-A. In step S33, the hash calculation of the encryption key information 34 is performed. In step S34, the hash check of the encryption key information 34 is performed to determine whether the hash value matches to the hash value 55. When the hash value matches to the hash value 55, the process proceeds to step S35. When the hash value does not match to the hash value 55, the error completion is performed.

In step S35, the encryption key information 34 thus decrypted is stored in the non-volatile memory. In step S36, the security direction information 35 thus decrypted is stored in the non-volatile memory, thereby completing the process.

Figure 14:
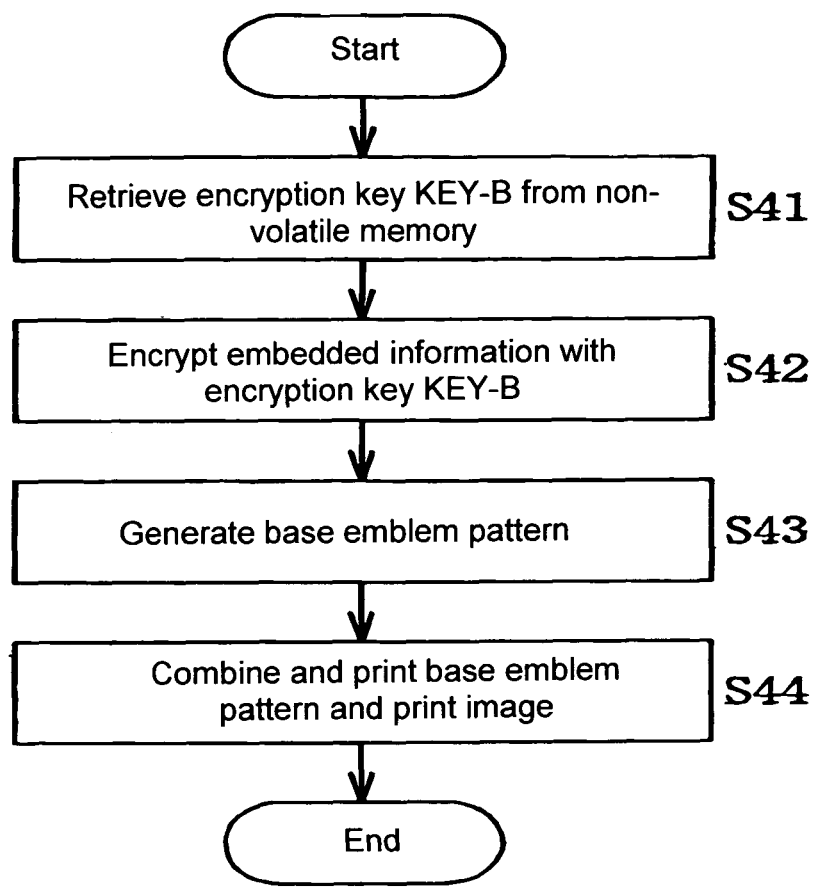
FIG. 14 is a flowchart showing an operation of the printer in printing a base emblem pattern according to the first embodiment of the present invention.

An operation of the printer 10 in printing the base emblem pattern will be explained next. FIG. 14 is a flowchart showing the operation of the printer 10 in printing the base emblem pattern according to the first embodiment of the present invention.

First, the encryption unit 15 retrieves the encryption key 54, i.e., the KEY-B, from the non-volatile memory. Then, the job information 50 encrypts the embedded information 70 with the encryption key 54, i.e., the KEY-B. Then, the base emblem pattern generation unit 16 converts the embedded information 70 thus encrypted with the encryption unit 15 to the base emblem pattern, thereby generating the base emblem pattern.

In the next step, the image generation unit 21 combines the base emblem pattern generated with the base emblem pattern generation unit 16 and the print image generated with the image forming unit 23, thereby generating the base emblem combined print image. Afterward, the printing unit 22 prints the base emblem combined print image.

The flowchart shown in FIG. 14 will be explained next. In step S41, the encryption key KEY-B is retrieved from the non-volatile memory. In step S42, the embedded information 70 is encrypted with the encryption key KEY-B. In step S43, the base emblem pattern is generated. In step S44, the base emblem pattern is combined with the print image, and the base emblem combined print image is printed, thereby completing the process.

As described above, in the embodiment, the host device 30 encrypts the job information 50 using the common key, and sends the job information 50 thus encrypted to the printer 10. Accordingly, it is possible to prevent the job information 50 from falsification. Further, the whole portion of the job information 50 including the print data 52 is not encrypted. Accordingly, it is possible to reduce a process time for encryption and decryption.

Further, in the embodiment, it is possible to decrypt the data embedded in the base emblem pattern only using the encryption key 54 included in the encryption key information 34 of the printer administrator setting information 36. Accordingly, it is possible to securely prevent a third party from peeking the data embedded in the base emblem pattern. Note that the job information 50 may use cryptography other than the common key cryptography.

Second Embodiment

A second embodiment of the invention will be described next. Components in the second embodiment similar to those in the first embodiment are designated by the same reference numerals, and explanations thereof are omitted. Further, explanations of operations and effects in the second embodiment similar to those in the first embodiment are omitted.

Figure 15:
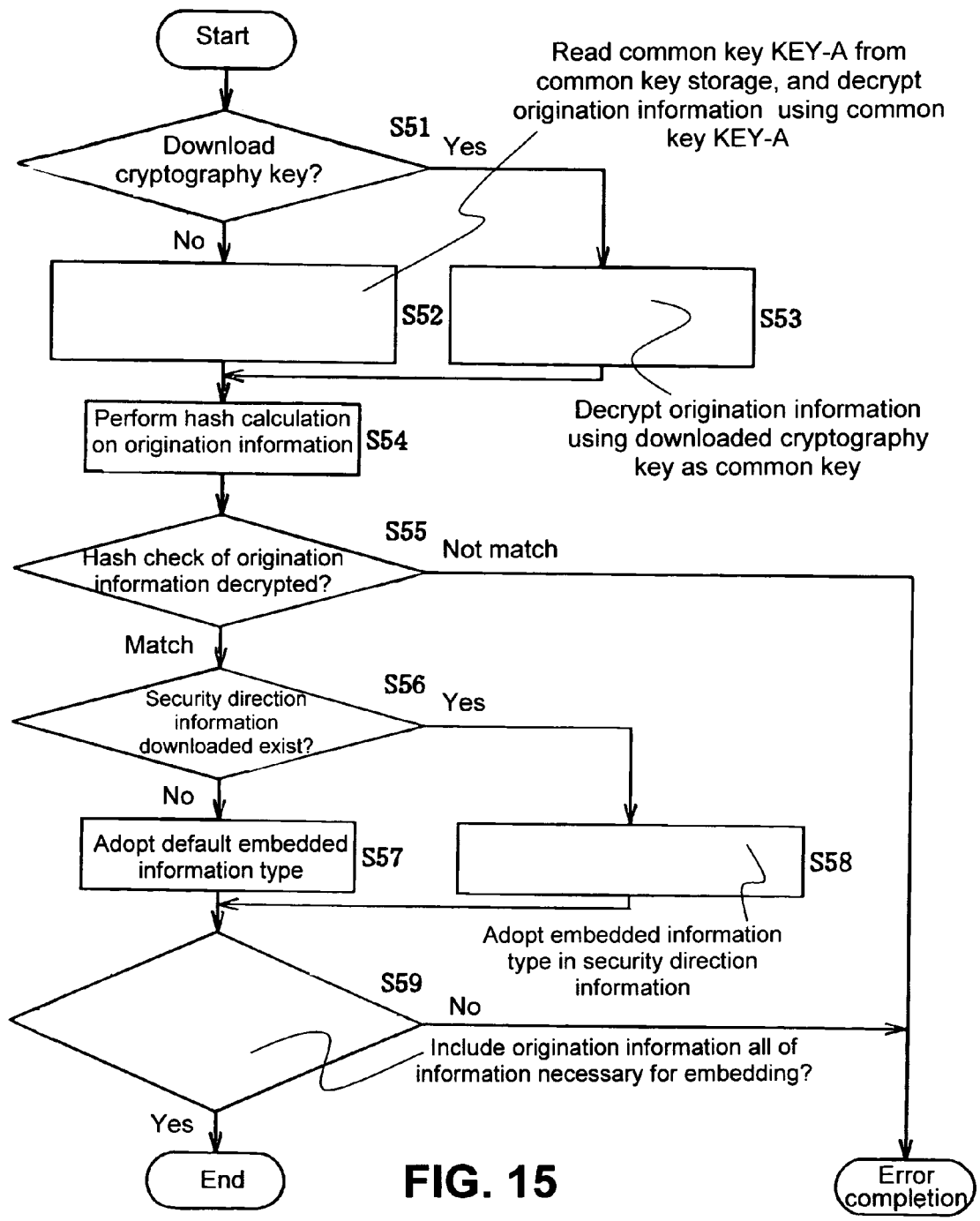
FIG. 15 is a flowchart showing an operation of an origination information decryption unit of a printer according to a second embodiment of the present invention.

FIG. 15 is a flowchart showing an operation of the origination information decryption unit 13 of the printer 10 according to the second embodiment of the present invention.

In the embodiment, when the printer 10 receives the job information 50, the printer 10 downloads the common key KEY-A from the host device 30 or a specific server (not shown) such as an http server, an ftp, a gopher, and the likes. For example, the printer 10 stores an address of a download origination of the common key KEY-A in advance, so that the printer 10 accesses the address to download the common key KEY-A. It may be arranged such that a user of the printer 10 can change the download origination upon using. When the printer 10 stores the address of the download origination, not the encryption key, it is possible to increase security.

In embodiment, the origination information decryption unit 13 determines whether a cryptography key is downloaded from the host device 30 or the specific server. More specifically, the origination information decryption unit 13 determines whether the printer 10 obtains the encryption key 54 in the encryption key information 34 included in the printer administrator setting information 36. When the printer 10 has the encryption key 54, the origination information decryption unit 13 decrypts the origination information 51 using the encryption key 54 thus downloaded as the common key. When the printer 10 does not have the encryption key 54, the origination information decryption unit 13 reads the common key KEY-A from the common key storage unit 26, and decrypts the origination information 51 using the common key.

In the next step, the origination information decryption unit 13 performs the hash calculation of the origination information 51 thus decrypted. Similar to the first embodiment, the hash calculation is performed using the SHA-1 hash function over the range from the administrator information 61 to the document name 67 in the origination information 51.

In the next step, the origination information decryption unit 13 performs the hash check on the origination information 51 thus decrypted, and compares the hash value generated in the hash function with the hash value 68 included in the origination information 51 to determine whether the hash value matches to the hash value 68. When the hash value does not match to the hash value 68, the origination information decryption unit 13 determines falsification and performs the error return or the error completion. When the hash value matches to the hash value 68, the origination information decryption unit 13 determines that the origination information 51 is proper and continues the process.

In the next step, it is determined whether the security direction information 35 thus downloaded exists. Note that the security direction information 35 includes information necessary for generating the base emblem pattern such as the security level specification 41, the embedded object origination information type specification 42, and the likes.

In the first embodiment, the security direction information 35 is included in the printer administrator setting information 36 to be sent from the administrator utility 32 to the printer 10. On the other hand, in the second embodiment, when a memory such as a USB memory retaining the security direction information 35 is attached to the printer 10, the security direction information 35 retained in the memory is downloaded. When there is not the security direction information 35 thus downloaded, the origination information decryption unit 13 adopts the default embedded information type stored in the printer program. When there is the security direction information 35 thus downloaded, the origination information decryption unit 13 adopts the embedded information type in the security direction information 35.

In the next step, the origination information decryption unit 13 determines whether the origination information 51 includes all of the information necessary for embedding, that is, there is sufficient information necessary for embedding. When there is not sufficient information necessary for embedding, the origination information decryption unit 13 performs the error return or the error completion. When there is sufficient information necessary for embedding, the origination information decryption unit 13 completes the process normally. Other configurations and operations are similar to those in the first embodiment, and explanations thereof are omitted.

The flowchart shown in FIG. 15 will be explained next. In step S51, it is determined whether there is the downloaded cryptography key. When there is the downloaded cryptography key, the process proceeds to step S53. When there is not the downloaded cryptography key, the process proceeds to step S52. In step S52, the common key KEY-A is read from the common key storage unit 26, and the origination information 51 is decrypted using the common key KEY-A. In step S53, the origination information 51 is decrypted using the encryption key 54 as the common key.

In step S54, the hash calculation is performed on the origination information 51 thus decrypted. In step S55, it is determined whether the hash check of the origination information 51 thus decrypted is matched. When the hash check of the origination information 51 thus decrypted is matched, the process proceeds to step S56. When the hash check of the origination information 51 thus decrypted is not matched, the error completion is performed.

In step S56, it is determined whether the security direction information 35 thus downloaded exists. When the security direction information 35 thus downloaded exists, the process proceeds to step S58. When the security direction information 35 thus downloaded does not exist, the process proceeds to step S57.

In step S57, the default embedded information type is adopted. In step S58, the embedded information type in the security direction information 35 is adopted. In step S59, it is determined whether the origination information 51 includes all of the information necessary for embedding. When the origination information 51 includes all of the information necessary for embedding, the process is completed. When the origination information 51 does not include all of the information necessary for embedding, the error completion is performed.

As described above, in the embodiment, the cryptography key for encrypting and decrypting the origination information 51 is downloaded from the host device 30 or the specific server. Accordingly, it is possible for a user to change the cryptography key. As a result, as compared with a case in which a same cryptography key is continuously used, it is possible to improve security.

Third Embodiment

A third embodiment of the invention will be described next. Components in the third embodiment similar to those in the first and second embodiments are designated by the same reference numerals, and explanations thereof are omitted. Further, explanations of operations and effects in the third embodiment similar to those in the first and second embodiments are omitted.

Figure 16:
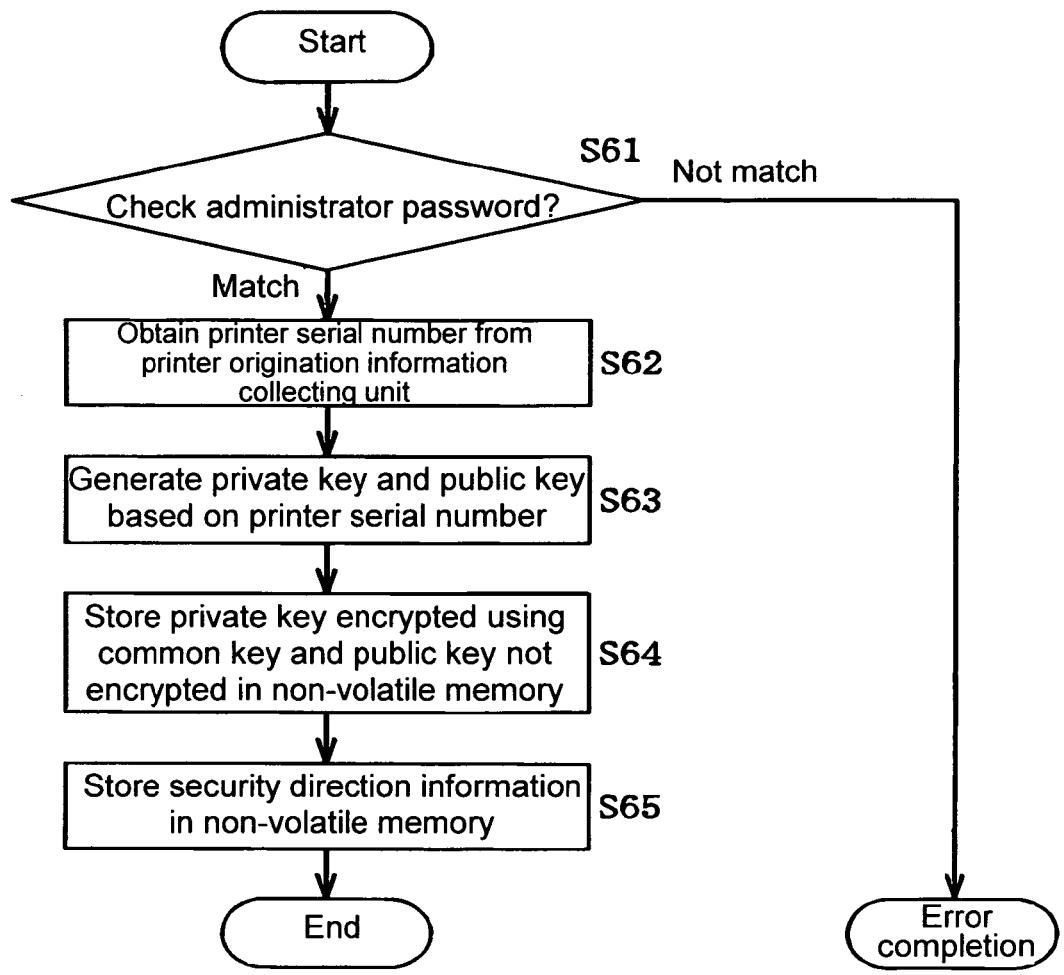
FIG. 16 is a flowchart showing an operation of a printer administrator setting receiving unit of a printer according to a third embodiment of the present invention.

In the third embodiment, operations of the printer administrator setting receiving unit 24 and the encryption unit 15 are different from those in the first embodiment. First, the operation of the printer administrator setting receiving unit 24 will be explained. FIG. 16 is a flowchart showing the operation of the printer administrator setting receiving unit 24 of the printer 10 according to the third embodiment of the present invention.

First, the printer administrator setting receiving unit 24 checks the administrator password 33 of the printer administrator setting information 36 received from the data determination unit 12, and determines whether the administrator password 33 matches to the administrator password provided in the printer 10. When the administrator password 33 does not match to the administrator password, the printer administrator setting receiving unit 24 performs the error return or the error completion.

When the administrator password 33 matches to the administrator password, the printer administrator setting receiving unit 24 obtains the printer serial number 79 from the printer origination information collecting unit 25. Then, the printer administrator setting receiving unit 24 generates a private key (KEY-Private) and a public key (KEY-Public) using a specific algorism according to the printer serial number 79.

In the next step, the printer administrator setting receiving unit 24 stores the private key encrypted using a specific common key (for example, the KEY-A) and the public key not encrypted in the non-volatile memory provided in the printer 10. Note that the printer administrator setting receiving unit 24 stores the private key in the non-volatile memory through encryption with the specific common key for security of the private key. Then, the printer administrator setting receiving unit 24 stores the security direction information 35 in the non-volatile memory provided in the printer 10, thereby completing the process.

The flowchart shown in FIG. 16 will be explained next. In step S61, the administrator password is checked to determine whether the administrator password 33 matches to the administrator password provided in the printer 10. When the administrator password 33 matches to the administrator password provided in the printer 10, the process proceeds to step S62.

When the administrator password 33 does not match to the administrator password provided in the printer 10, the error completion is performed.

In step S62, the printer serial number 79 is obtained from the printer origination information collecting unit 25. In step S63, the private key and the public key are generated based on the printer serial number 79. In step S64, the private key encrypted using the common key and the public key not encrypted are stored in the non-volatile memory. In step S65, the security direction information 35 is stored in the non-volatile memory, thereby completing the process.

Figure 17:
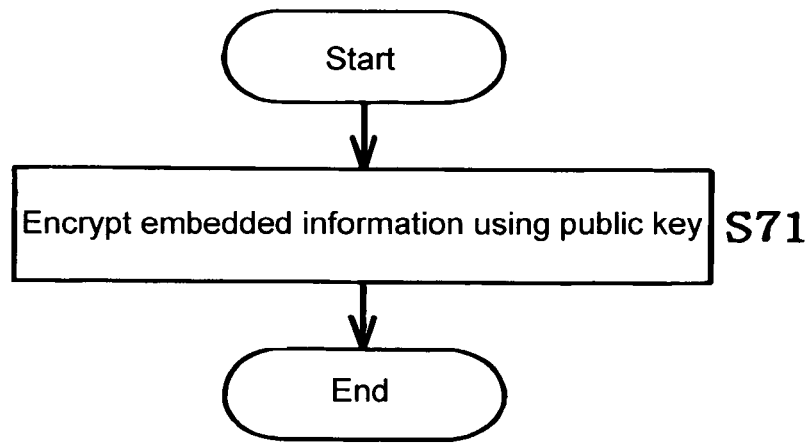
FIG. 17 is a flowchart showing an operation of an encryption unit of the printer according to the third embodiment of the present invention.

The operation of the encryption unit 15 will be explained next. FIG. 17 is a flowchart showing the operation of the encryption unit 15 of the printer 10 according to the third embodiment of the present invention.

In the embodiment, the encryption unit 15 encrypts the embedded information 70 using the public key. In encrypting using the public key, the encryption key is different from the decryption key, and the encryption key is held in secret. As an example, RSA encryption, ElGamal encryption, and the likes are known.

As describe above, in encrypting using the public key, the encryption key is different from the decryption key. Accordingly, it is possible to make the decryption key public. Further, it is not necessary to send the decryption key in secret, thereby making it easy to send the key. Still further, it is possible to provide an authentication function for confirming that a sender of a communication thus sent is not false, or the communication is not tampered.

In the embodiment, when the information embedded in the base emblem pattern is decrypted, it is necessary to obtain the public key generated with the printer 10. Accordingly, the printer 10 may be provided with a function of sending the public key thus generated to the host device 30 and the likes requesting the public key. Further, the printer 10 may be provided with a response function of PJL or a function of Web Page. Other configurations and operations are similar to those in the first embodiment, and explanations thereof are omitted.

The flowchart shown in FIG. 17 will be explained next. In step S71, the embedded information 70 is encrypted using the public key, thereby completing the process.

As described above, different from the first embodiment, in the third embodiment, the embedded information 70 is encrypted using the public key. Accordingly, the printer 10 makes only the public key public, and holds the private key in secret. Further, the public key and the private key are generated according to the serial number that is different per the printer 10. Accordingly, even when the printer 10 is a same type, the serial number is different with each other.

In the embodiment, the data embedded in the base emblem pattern is decrypted using the public key made public with the printer 10 expected. When the data are decrypted properly, it is possible to determine that the result is output from the printer 10 expected. When the data are decrypted properly, it is possible to determine that the result is output from the printer 10 not expected, thereby preventing falsification.

Fourth Embodiment

A fourth embodiment of the invention will be described next. Components in the fourth embodiment similar to those in the first to third embodiments are designated by the same reference numerals, and explanations thereof are omitted. Further, explanations of operations and effects in the fourth embodiment similar to those in the first to third embodiments are omitted.

Figure 18:
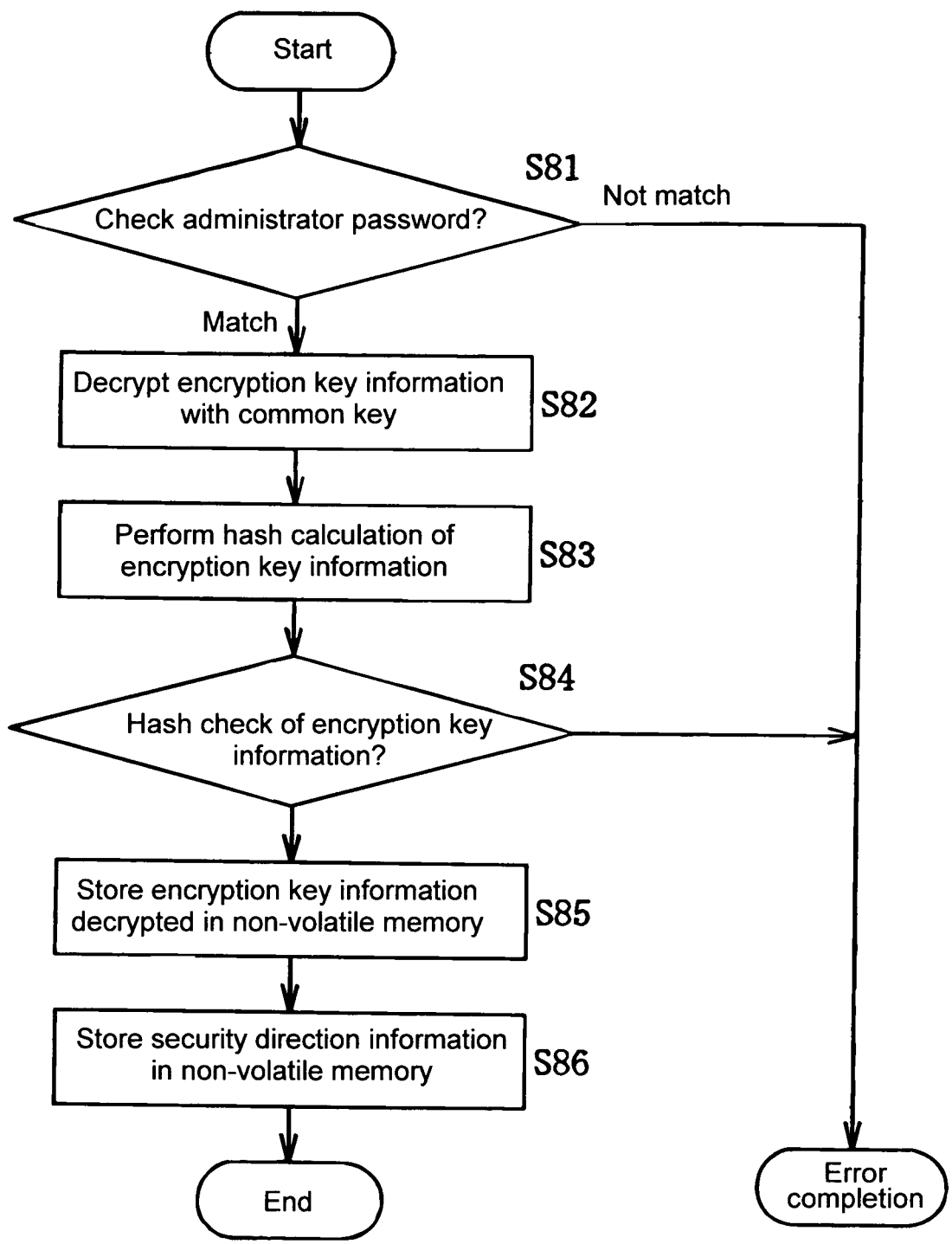
FIG. 18 is a flowchart showing an operation of a printer administrator setting receiving unit of a printer according to a fourth embodiment of the present invention.

FIG. 18 is a flowchart showing an operation of the printer administrator setting receiving unit 24 of the printer 10 according to the fourth embodiment of the present invention.

In the first embodiment, the common key of the 3DES is used as the encryption key 54 in the encryption key information 34 included in the printer administrator setting information 36. In the fourth embodiment, the public key generated with the host device 30 is used.

In the embodiment, first, the printer administrator setting receiving unit 24 checks the administrator password 33 of the printer administrator setting information 36 received from the data determination unit 12, and determines whether the administrator password 33 matches to the administrator password provided in the printer 10. When the administrator password 33 does not match to the administrator password, the printer administrator setting receiving unit 24 performs the error return or the error completion. When the administrator password 33 matches to the administrator password, the printer administrator setting receiving unit 24 decrypts the printer administrator setting information 36 using the common key.

In the next step, the printer administrator setting receiving unit 24 performs the hash calculation of the encryption key information 34 and the hash check of the encryption key information 34. In this case, the printer administrator setting receiving unit 24 compares the hash value generated in the hash function with the hash value 55 included in the encryption key information 34 to determine whether the hash value matches to the hash value 55. When the hash value does not match to the hash value 55, the printer administrator setting receiving unit 24 performs the error return or the error completion. When the hash value matches to the hash value 55, the printer administrator setting receiving unit 24 continues the process and stores the encryption key information 34 as encrypted in the non-volatile memory.

When the printer administrator setting receiving unit 24 stores the encryption key information 34 in the non-volatile memory, the printer administrator setting receiving unit 24 specifies a file name based on the customer ID information 53. Accordingly, it is possible to store the encryption key information 34 together according to the customer ID information 53 that is different. Further, through sending the printer administrator setting information 36 to the printer 10 several times, it is possible to store a plurality of the encryption key information 34 in the non-volatile memory provided in the printer 10.

In the next step, the printer administrator setting receiving unit 24 stores the security direction information 35 in the non-volatile memory provided in the printer 10, thereby completing the process.

In the embodiment, the public key generated at the host device 30 is used as the cryptography key. That is, the printer administrator collects the public key generated at the host device 30, and adds the public key to the printer administrator setting information 36 to be sent to the printer 10 while updating the customer ID information 53. The printer 10 stores the public key generated at the host device 30, so that the public key thus stored is used for decrypting the origination information 51.

In the embodiment, the customer ID information 53 is located at a front end of the origination information 51, and the origination information 51 is not encrypted. Further, the printer 10 searches the encryption key information 34 in the non-volatile memory thereof using the customer ID information 53. Still further, the encryption key information 34 is assigned with the file name based on the customer ID information 53. When a corresponding file is found, the corresponding file is decrypted using the common key, thereby obtaining the encryption key 54 therein. When the corresponding file for encrypting the origination information 51 using the encryption key 54 is not found, it is determined that the print data 52 is sent from the host device 30 not registered. Accordingly, the printer 10 does not perform the printing operation.

In the embodiment, zero in the customer ID information 53 has a specific meaning, and cannot be used for registering the public key of the host device 30. In this case, the private key for encrypting the embedded information is registered for encrypting zero in the customer ID information 53. Accordingly, the printer 10 uses the private key for encrypting zero in the customer ID information 53 using the 3DES. Other configurations in the fourth embodiment are similar to those in the first embodiment, and explanations thereof are omitted.

The flowchart shown in FIG. 18 will be explained next. In step S81, the administrator password is checked to determine whether the administrator password 33 matches to the administrator password provided in the printer 10. When the administrator password 33 matches to the administrator password provided in the printer 10, the process proceeds to step S82. When the administrator password 33 does not match to the administrator password provided in the printer 10, the error completion is performed.

In step S82, the encryption key information 34 thus received is decrypted with the common key. In step S83, the hash calculation of the encryption key information 34 is performed. In step S84, the hash check of the encryption key information 34 is performed to determine whether the hash value matches to the hash value 55. When the hash value matches to the hash value 55, the process proceeds to step S85. When the hash value does not match to the hash value 55, the error completion is performed.

In step S85, the encryption key information 34 thus decrypted is stored in the non-volatile memory. In step S86, the security direction information 35 is stored in the non-volatile memory, thereby completing the process.

As described above, in the embodiment, the public key registered from outside is used for decrypting the origination information 51. It is possible to register a plurality of the public keys in the printer 10, and the print command from the host device 30 with the public key not registered is rejected. That is, the printer administrator can specify a user who can print per the printer 10.

Further, the public key for decryption is different per user, thereby making it possible to prevent falsification or alteration. The private key is used for encrypting the embedded information 70. Alternatively, similar to the third embodiment, the private key and the public key generated from the serial number may be used.

Fifth Embodiment

A fifth embodiment of the invention will be described next. Components in the fifth embodiment similar to those in the first to fourth embodiments are designated by the same reference numerals, and explanations thereof are omitted. Further, explanations of operations and effects in the fifth embodiment similar to those in the first to fourth embodiments are omitted.

Figure 19:
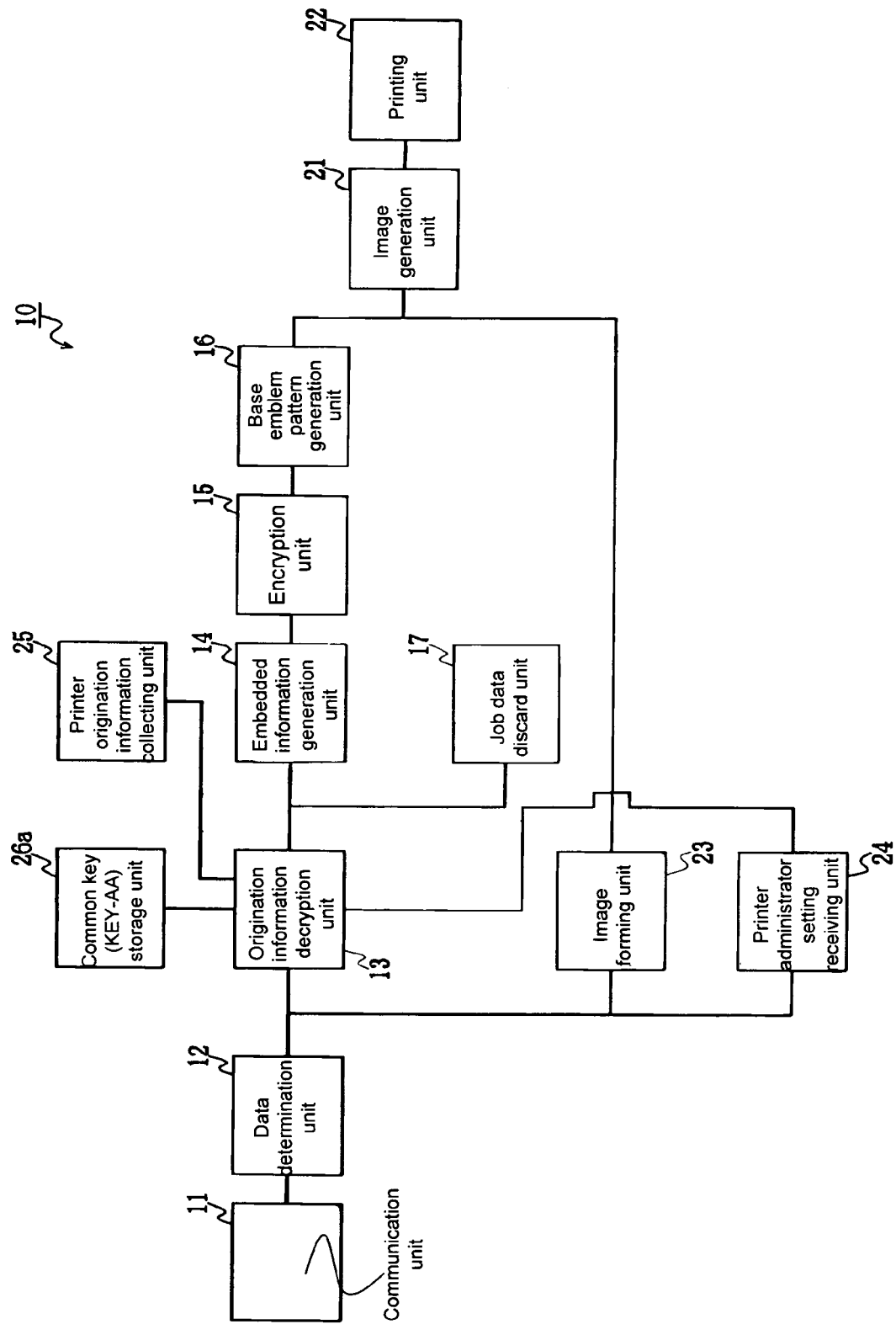
FIG. 19 is a block diagram showing a configuration of a printer according to a fifth embodiment of the present invention.
Figure 20:
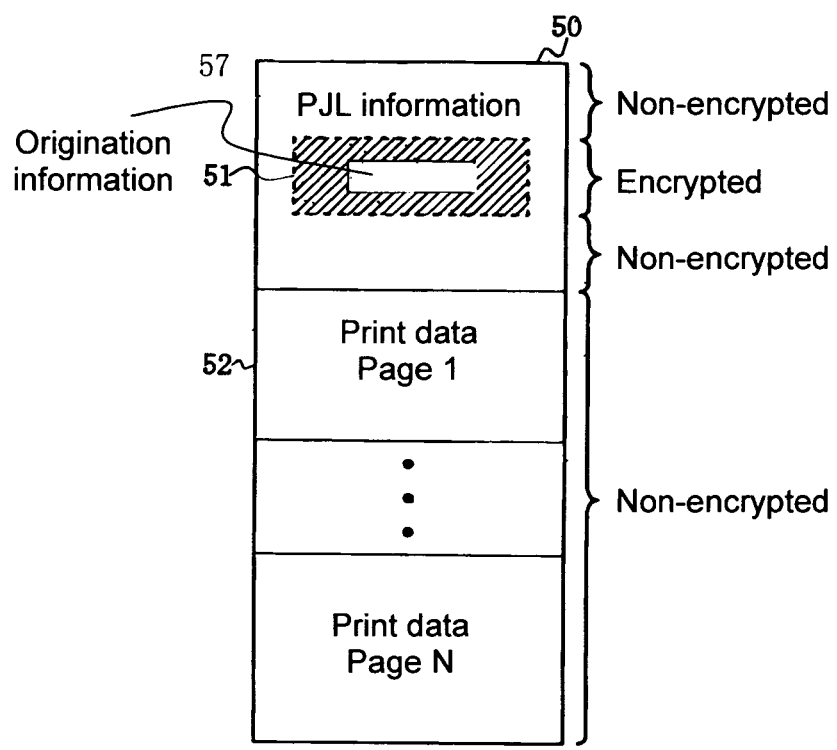
FIG. 20 is a schematic view showing a configuration of job information according to the fifth embodiment of the present invention.
Figure 21:
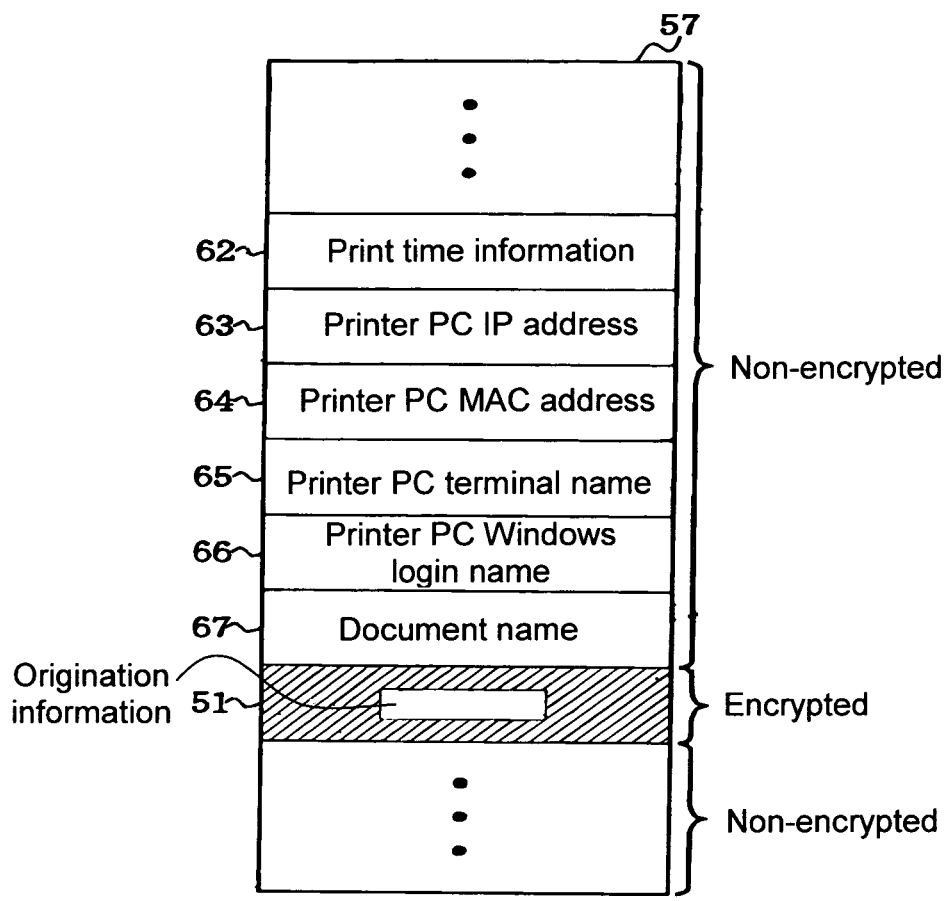
FIG. 21 is a schematic view showing a configuration of PJL information according to the fifth embodiment of the present invention.

FIG. 19 is a block diagram showing a configuration of the printer 10 according to the fifth embodiment of the present invention. FIG. 20 is a schematic view showing a configuration of the job information 50 according to the fifth embodiment of the present invention. FIG. 21 is a schematic view showing a configuration of PJL information 57 according to the fifth embodiment of the present invention.

As shown in FIG. 19, the printer 10 includes the communication unit 11; the data determination unit 12; the origination information decryption unit 13; the embedded information generation unit 14; the encryption unit 15; the base emblem pattern generation unit 16; the job data discard unit 17; the image generation unit 21; the printing unit 22; the image forming unit 23; the printer administrator setting receiving unit 24; the printer origination information collecting unit 25; and a common key (KEY-AA) storage unit 26a. Note that the printer administer setting information reading unit 27 in the first embodiment is omitted.

As shown in FIG. 20, the job information 50 includes the PJL information 57 including the origination information 51 and the print data 52. The origination information 51 is data encrypted, and the PJL information 57 is data not encrypted except the origination information 51. Further, the print data 52 are data not encrypted. A PJL is a command language developed by Hewlett Packard, and has a function of controlling a print job during a printing operation of a printer. Further, the origination information 51 exists as a part of the PJL information 57.

In the embodiment, the origination information 51 is encrypted with the common key KEY-BB through a specific encryption algorism (for example, AES). The document name 67 is encrypted with the common key KEY-AA through a specific encryption algorism (for example, AES) from the PJL information, and a result of the encryption becomes the common key KEY-BB.

In the embodiment, the PJL information 57 includes a specific PJL command other than the command developed by Hewlett Packard. As shown in FIG. 21, the specific PJL command includes the print time information 62; the printer PC IP address 63; the printer PC MAC address 64; the printer PC terminal name 65; the printer PC Windows log-on name; the document name 67; and the origination information 51. Note that a portion from the print time information 62 to the document name 67 is data not encrypted. Other configurations are similar to those in the first embodiment, and explanations thereof are omitted.

Figure 22:
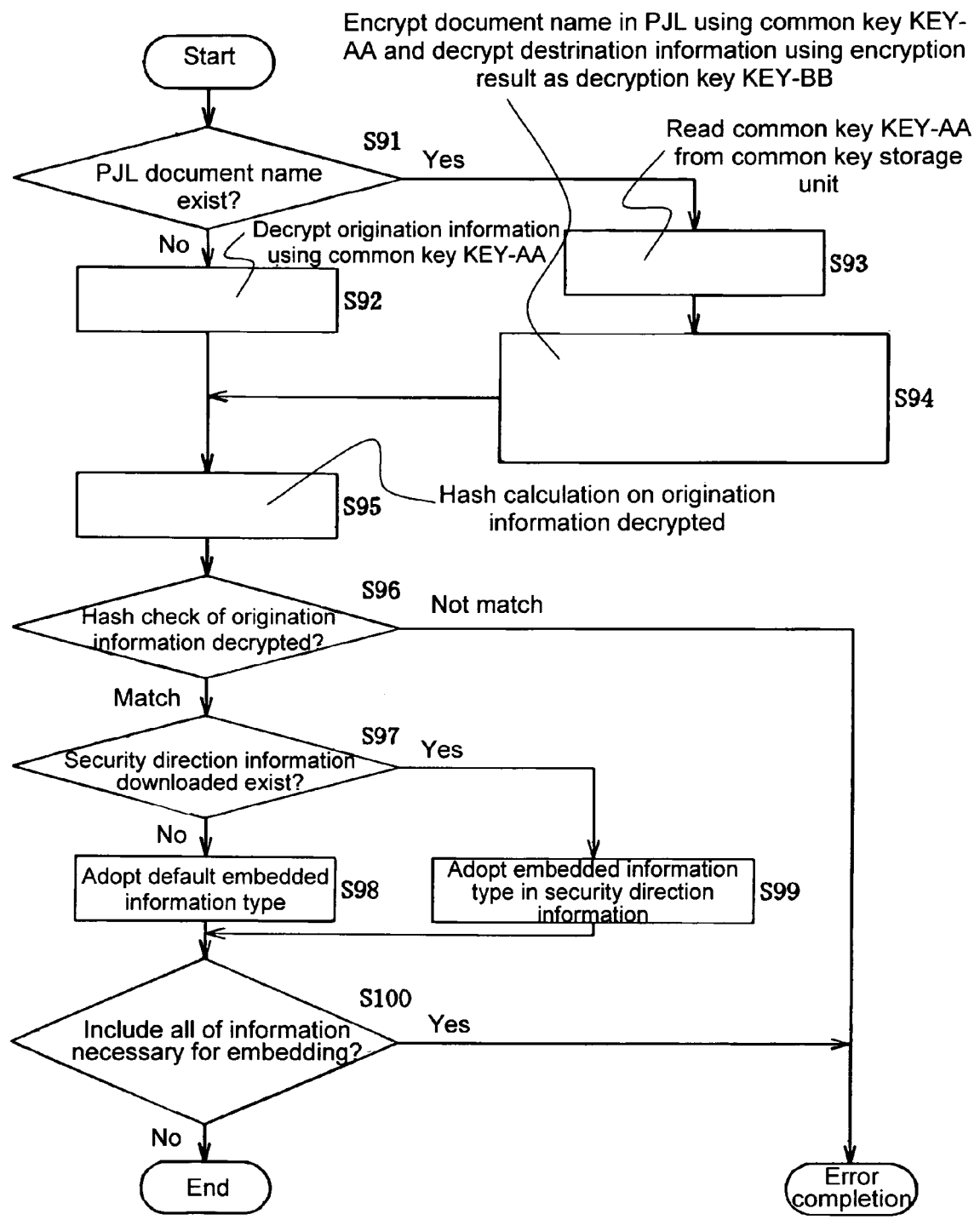
FIG. 22 is a flowchart showing an operation of an origination information decryption unit of the printer according to the fifth embodiment of the present invention.

An operation of the printer 10 will be explained next. First, an operation of the origination information decryption unit 13 will be explained. FIG. 22 is a flowchart showing the operation of the origination information decryption unit 13 of the printer 10 according to the fifth embodiment of the present invention.

First, the origination information decryption unit 13 determines whether there is the document name 67 in the PJL command. When there is the document name 67 in the PJL command, the origination information decryption unit 13 reads a common key KEY-AA from the common key storage unit 26a. Then, the origination information decryption unit 13 encrypts the document name 67 in the PJL command using the common key KEY-AA. Then, the origination information decryption unit 13 converts the encryption result as a decryption key KEY-BB, and decrypts the origination information 51 using the decryption key KEY-BB.

When there is not the document name 67 in the PJL command, the origination information decryption unit 13 decrypts the origination information 51 using the common key KEY-AA. In decryption, an AES is used as an algorism for decryption. The AES is a common key cryptography standardized according to Advanced Encryption Standard of the USA.

In the next step, the origination information decryption unit 13 performs the hash calculation of the origination information 51 thus decrypted. The hash calculation is performed using the SHA-1 hash function.

In the next step, the origination information decryption unit 13 performs the hash check on the origination information 51 thus decrypted, and compares the hash value generated in the hash function with the hash value 68 included in the origination information 51 to determine whether the hash value matches to the hash value 68. When the hash value does not match to the hash value 68, the origination information decryption unit 13 determines falsification and performs the error return or the error completion. When the hash value matches to the hash value 68, the origination information decryption unit 13 determines that the origination information 51 is proper and continues the process.

In the next step, it is determined whether the security direction information 35 thus downloaded exists. Note that the security direction information 35 includes information necessary for generating the base emblem pattern such as the security level specification 41, the embedded object origination information type specification 42, and the likes. In the embodiment, when a memory such as a USB memory retaining the security direction information 35 is attached to the printer 10, the security direction information 35 retained in the memory is downloaded. When there is not the security direction information 35 thus downloaded, the origination information decryption unit 13 adopts the default embedded information type stored in the printer program. When there is the security direction information 35 thus downloaded, the origination information decryption unit 13 adopts the embedded information type in the security direction information 35.

In the next step, the origination information decryption unit 13 determines whether the origination information 51 includes all of the information necessary for embedding, that is, there is sufficient information necessary for embedding. When there is not sufficient information necessary for embedding, the origination information decryption unit 13 performs the error return or the error completion. When there is sufficient information necessary for embedding, the origination information decryption unit 13 completes the process normally.

The flowchart shown in FIG. 22 will be explained next. In step S91, it is determined whether there is the PJL document name. When there is the PJL document name, the process proceeds to step S93. When there is not the PJL document name, the process proceeds to step S92.

In step S92, the origination information 51 is decrypted using the common key KEY-AA. In step S93, the common key KEY-AA is read from the common key storage unit 26a. In step S94, the document name in the PJL is encrypted using the common key KEY-AA. Then, the encryption result is converted to the decryption key KEY-BB, thereby decrypting the origination information 51.

In step S95, the hash calculation is performed on the origination information 51 thus decrypted. In step S96, it is determined whether the hash check of the origination information 51 thus decrypted is matched. When the hash check of the origination information 51 thus decrypted is matched, the process proceeds to step S97. When the hash check of the origination information 51 thus decrypted is not matched, the error completion is performed.

In step S97, it is determined whether the security direction information 35 thus downloaded exists. When the security direction information 35 thus downloaded exists, the process proceeds to step S99. When the security direction information 35 thus downloaded does not exist, the process proceeds to step S98.

In step S98, the default embedded information type is adopted. In step S99, the embedded information type in the security direction information 35 is adopted. In step S100, it is determined whether the origination information 51 includes all of the information necessary for embedding. When the origination information 51 includes all of the information necessary for embedding, the process is completed. When the origination information 51 does not include all of the information necessary for embedding, the error completion is performed.

Figure 23:
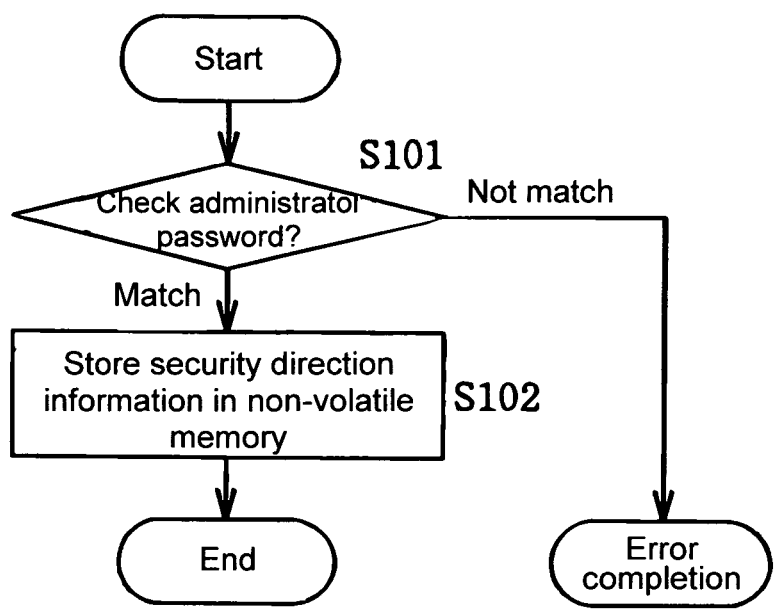
FIG. 23 is a flowchart showing an operation of a printer administrator setting receiving unit of the printer according to the fifth embodiment of the present invention.

An operation of the printer administrator setting receiving unit 24 will be explained next. Operations of the embedded information generation unit 14 and the encryption unit 15 are similar to those in the first embodiment, and explanations thereof are omitted. FIG. 23 is a flowchart showing the operation of the printer administrator setting receiving unit 24 of the printer 10 according to the fifth embodiment of the present invention.

First, the printer administrator setting receiving unit 24 checks the administrator password 33 of the printer administrator setting information 36 received from the data determination unit 12, and determines whether the administrator password 33 matches to the administrator password provided in the printer 10. In this case, the administrator password provided in the printer 10 is changed based on the serial number of the printer 10 different with each other. Accordingly, even when the printer 10 is the same type, the serial number is different.

When the administrator password 33 does not match to the administrator password, the printer administrator setting receiving unit 24 performs the error return or the error completion. When the administrator password 33 matches to the administrator password, the printer administrator setting receiving unit 24 stores the security direction information 35 in the non-volatile memory provided in the printer 10, thereby completing the process.

The flowchart shown in FIG. 23 will be explained next. In step S101, the administrator password is checked to determine whether the administrator password 33 matches to the administrator password provided in the printer 10. When the administrator password 33 matches to the administrator password provided in the printer 10, the process proceeds to step S102. When the administrator password 33 does not match to the administrator password provided in the printer 10, the error completion is performed. In step S102, the security direction information 35 is stored in the non-volatile memory, thereby completing the process.

As described above, in the embodiment, the origination information 51 is encrypted with the first encryption method using the encryption key encrypted with the fourth encryption method. Further, the origination information 51 is decrypted using the document name 67 sent to the printer 10 according to the PJL command as the decryption key. Since the document name 67 is different per document, it is possible to use the decryption key different per document. Further, the document name 67 is used after encrypted with the common key KEY-AA, not used as the decryption key as is, thereby obtaining strong cryptography.

Sixth Embodiment

A sixth embodiment of the invention will be described next. Components in the sixth embodiment similar to those in the first to fifth embodiments are designated by the same reference numerals, and explanations thereof are omitted.

Further, explanations of operations and effects in the sixth embodiment similar to those in the first to fifth embodiments are omitted.

Figure 24:
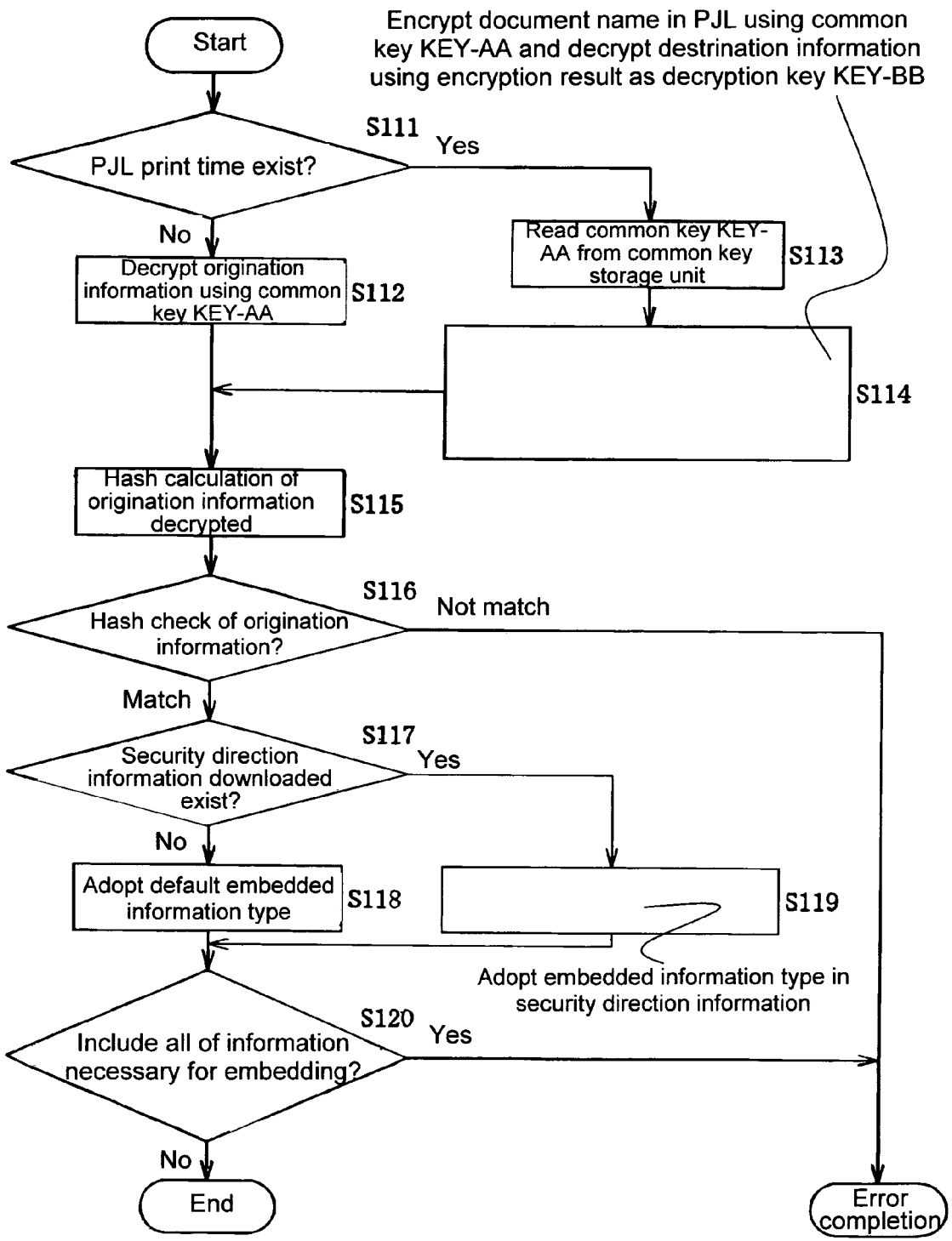
FIG. 24 is a flowchart showing an operation of an origination information decryption unit of a printer according to a sixth embodiment of the present invention.

FIG. 24 is a flowchart showing an operation of the origination information decryption unit 13 of the printer 10 according to the sixth embodiment of the present invention.

In the second embodiment, the encryption key information 34, i.e., a part of the printer administrator setting information 36, is used for sending the encryption key to the printer 10 for encrypting the origination information 51. In the sixth embodiment, the print time information 62 is used for generating the encryption key.

In particular, the origination information 51 is encrypted with the common key KEY-BB through a specific encryption algorism (for example, AES). The print time information 62 is encrypted with the common key KEY-AA through a specific encryption algorism (for example, AES) from the PJL information, and a result of the encryption becomes the common key KEY-BB.

In the embodiment, first, the origination information decryption unit 13 determines whether there is PJL print time information, and determines whether there is the print time information 62 in the PJL command. When there is the print time information 62 in the PJL command, the origination information decryption unit 13 reads the common key KEY-AA from the common key storage unit 26a. Then, the origination information decryption unit 13 encrypts the print time information 62 in the PJL command using the common key KEY-AA. Then, the origination information decryption unit 13 converts the encryption result to the decryption key KEY-BB, and decrypts the origination information 51 using the decryption key KEY-BB.

When there is not the print time information 62 in the PJL command, the origination information decryption unit 13 decrypts the origination information 51 using the common key KEY-AA. In decryption, the AES is used as the algorism for decryption.

In the next step, the origination information decryption unit 13 performs the hash calculation of the origination information 51 thus decrypted. The hash calculation is performed using the SHA-1 hash function.

In the next step, the origination information decryption unit 13 performs the hash check on the origination information 51 thus decrypted, and compares the hash value generated in the hash function with the hash value 68 included in the origination information 51 to determine whether the hash value matches to the hash value 68. When the hash value does not match to the hash value 68, the origination information decryption unit 13 performs the error return or the error completion. When the hash value matches to the hash value 68, the origination information decryption unit 13 determines whether the security direction information 35 thus downloaded exists. When there is not the security direction information 35 thus downloaded, the origination information decryption unit 13 adopts the default embedded information type. When there is the security direction information 35 thus downloaded, the origination information decryption unit 13 adopts the embedded information type in the security direction information 35.

In the next step, the origination information decryption unit 13 determines whether the origination information 51 includes all of the information necessary for embedding, that is, there is sufficient information necessary for embedding. When there is not sufficient information necessary for embedding, the origination information decryption unit 13 performs the error return or the error completion. When there is sufficient information necessary for embedding, the origination information decryption unit 13 completes the process normally.

The flowchart shown in FIG. 24 will be explained next. In step S111, it is determined whether there is the PJL print time. When there is the PJL print time, the process proceeds to step S113. When there is not the PJL print time, the process proceeds to step S112.

In step S112, the origination information 51 is decrypted using the common key KEY-AA. In step S113, the common key KEY-AA is read from the common key storage unit 26a. In step S114, the print time information 62 in the PJL command is encrypted using the common key KEY-AA. Then, the encryption result is converted to the decryption key KEY-BB, thereby decrypting the origination information 51.

In step S115, the hash calculation is performed on the origination information 51 thus decrypted. In step S116, it is determined whether the hash check of the origination information 51 thus decrypted is matched. When the hash check of the origination information 51 thus decrypted is matched, the process proceeds to step S117. When the hash check of the origination information 51 thus decrypted is not matched, the error completion is performed.

In step S117, it is determined whether the security direction information 35 thus downloaded exists. When the security direction information 35 thus downloaded exists, the process proceeds to step S119. When the security direction information 35 thus downloaded does not exist, the process proceeds to step S118.

In step S118, the default embedded information type is adopted. In step S119, the embedded information type in the security direction information 35 is adopted. In step S120, it is determined whether the origination information 51 includes all of the information necessary for embedding. When the origination information 51 includes all of the information necessary for embedding, the process is completed. When the origination information 51 does not include all of the information necessary for embedding, the error completion is performed.

As described above, in the embodiment, the text string of the print time information 62 sent to the printer 10 in the PJL command is used as the decryption key of the origination information 51. Note that the text string of the print time information 62 may be, for example, as follows:

08:30:19 2005/12/03

In the fifth embodiment, the document name 67 is used as the decryption key of the origination information 51. Accordingly, when documents having a same name are printed, the same cryptography key is used. In the sixth embodiment, on the other hand, the cryptography key is used in the first encryption method for encrypting the origination information 51. Further, the cryptography key is encrypted with the fourth encryption method using the print time encrypted as the cryptography key, i.e., the print time information 62. Accordingly, the same cryptography key is not used per job.

Further, the text string of the print time information 62 is not used as the decryption key as is, rather is encrypted with the common key KEY-AA, thereby obtaining strong cryptography.

Seventh Embodiment

A seventh embodiment of the invention will be described next. Components in the seventh embodiment similar to those in the first to sixth embodiments are designated by the same reference numerals, and explanations thereof are omitted.

Further, explanations of operations and effects in the seventh embodiment similar to those in the first to sixth embodiments are omitted.

Figure 25:
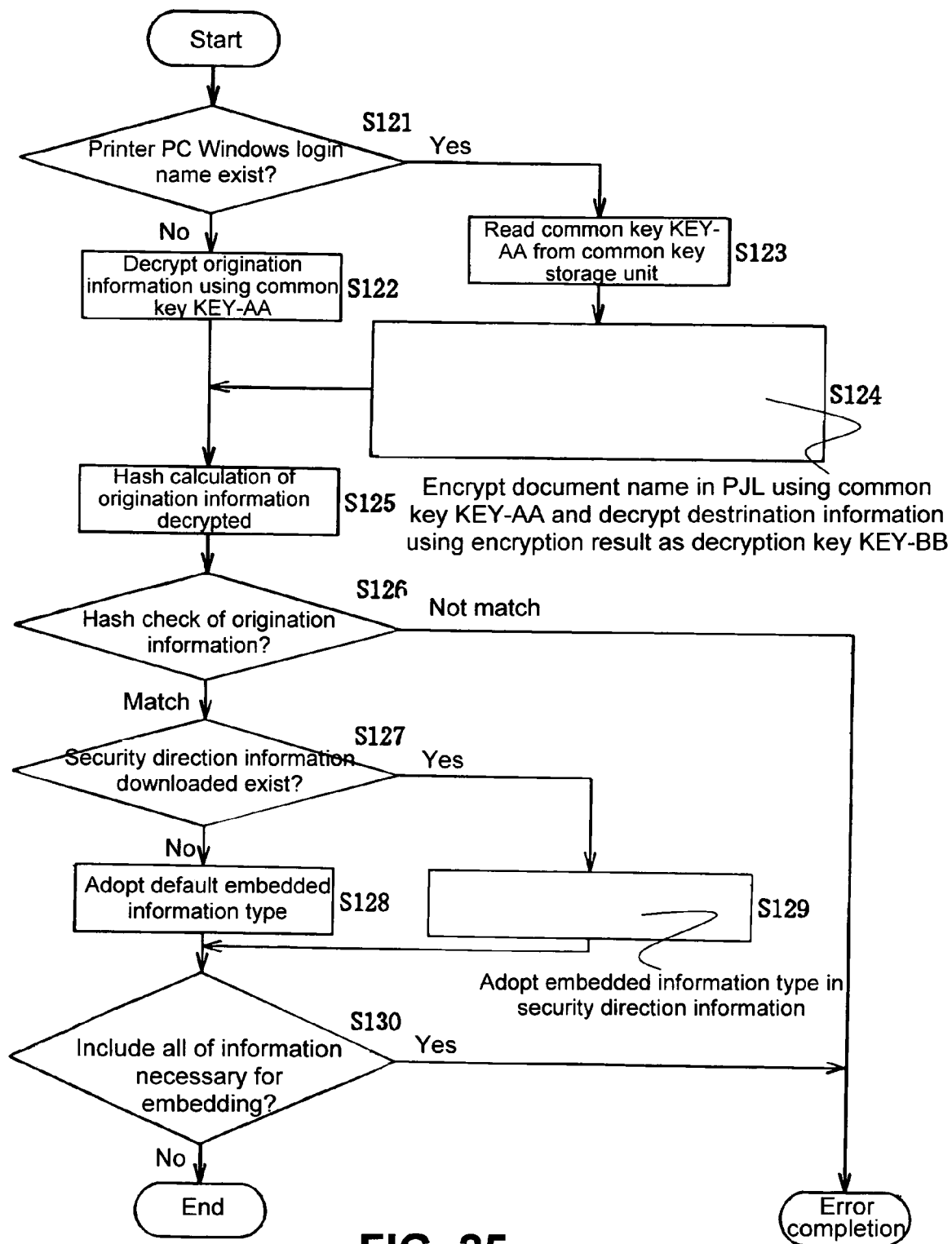
FIG. 25 is a flowchart showing an operation of an origination information decryption unit of a printer according to a seventh embodiment of the present invention.

FIG. 25 is a flowchart showing an operation of the origination information decryption unit 13 of the printer 10 according to the seventh embodiment of the present invention.

In the second embodiment, the encryption key information 34, i.e., a part of the printer administrator setting information 36, is used for sending the encryption key to the printer 10 for encrypting the origination information 51. In the seventh embodiment, the printer PC Windows login name 66 is used for generating the encryption key.

In the embodiment, the origination information 51 is encrypted with the common key KEY-BB through a specific encryption algorism (for example, AES). The printer PC Windows login name 66 is encrypted with the common key KEY-AA through a specific encryption algorism (for example, AES) from the PJL information, and a result of the encryption becomes the common key KEY-BB.

In the embodiment, first, the origination information decryption unit 13 determines whether there is a PJL Windows login name, and determines whether there is the printer PC Windows login name 66 in the PJL command. When there is the printer PC Windows login name 66 in the PJL command, the origination information decryption unit 13 reads the common key KEY-AA from the common key storage unit 26a. Then, the origination information decryption unit 13 encrypts the printer PC Windows login name 66 in the PJL command using the common key KEY-AA. Then, the origination information decryption unit 13 converts the encryption result to the decryption key KEY-BB, and decrypts the origination information 51 using the decryption key KEY-BB.

When there is not the printer PC Windows login name 66 in the PJL command, the origination information decryption unit 13 decrypts the origination information 51 using the common key KEY-AA. In decryption, the AES is used as the algorism for decryption.

In the next step, the origination information decryption unit 13 performs the hash calculation of the origination information 51 thus decrypted. The hash calculation is performed using the SHA-1 hash function.

In the next step, the origination information decryption unit 13 performs the hash check on the origination information 51 thus decrypted, and compares the hash value generated in the hash function with the hash value 68 included in the origination information 51 to determine whether the hash value matches to the hash value 68. When the hash value does not match to the hash value 68, the origination information decryption unit 13 performs the error return or the error completion. When the hash value matches to the hash value 68, the origination information decryption unit 13 determines whether the security direction information 35 thus downloaded exists. When there is not the security direction information 35 thus downloaded, the origination information decryption unit 13 adopts the default embedded information type. When there is the security direction information 35 thus downloaded, the origination information decryption unit 13 adopts the embedded information type in the security direction information 35.

In the next step, the origination information decryption unit 13 determines whether the origination information 51 includes all of the information necessary for embedding, that is, there is sufficient information necessary for embedding. When there is not sufficient information necessary for embedding, the origination information decryption unit 13 performs the error return or the error completion. When there is sufficient information necessary for embedding, the origination information decryption unit 13 completes the process normally.

The flowchart shown in FIG. 25 will be explained next. In step S121, it is determined whether there is the printer PC Windows login name 66. When there is the printer PC Windows login name 66, the process proceeds to step S123. When there is not the printer PC Windows login name 66, the process proceeds to step S122.

In step S122, the origination information 51 is decrypted using the common key KEY-AA. In step S123, the common key KEY-AA is read from the common key storage unit 26a. In step S124, the printer PC Windows login name 66 in the PJL command is encrypted using the common key KEY-AA. Then, the encryption result is converted to the decryption key KEY-BB, thereby decrypting the origination information 51.

In step S125, the hash calculation is performed on the origination information 51 thus decrypted. In step S126, it is determined whether the hash check of the origination information 51 thus decrypted is matched. When the hash check of the origination information 51 thus decrypted is matched, the process proceeds to step S127. When the hash check of the origination information 51 thus decrypted is not matched, the error completion is performed.

In step S127, it is determined whether the security direction information 35 thus downloaded exists. When the security direction information 35 thus downloaded exists, the process proceeds to step S129. When the security direction information 35 thus downloaded does not exist, the process proceeds to step S128.

In step S128, the default embedded information type is adopted. In step S129, the embedded information type in the security direction information 35 is adopted. In step S130, it is determined whether the origination information 51 includes all of the information necessary for embedding. When the origination information 51 includes all of the information necessary for embedding, the process is completed. When the origination information 51 does not include all of the information necessary for embedding, the error completion is performed.

As described above, in the embodiment, the printer PC Windows login name 66 sent to the printer 10 in the PJL command is used as the decryption key of the origination information 51. Accordingly, it is possible to decrypt the origination information 51 using the cryptography key that is different per the printer.

Eighth Embodiment

An eighth embodiment of the invention will be described next. Components in the eighth embodiment similar to those in the first to seventh embodiments are designated by the same reference numerals, and explanations thereof are omitted. Further, explanations of operations and effects in the eighth embodiment similar to those in the first to seventh embodiments are omitted.

Figure 26:
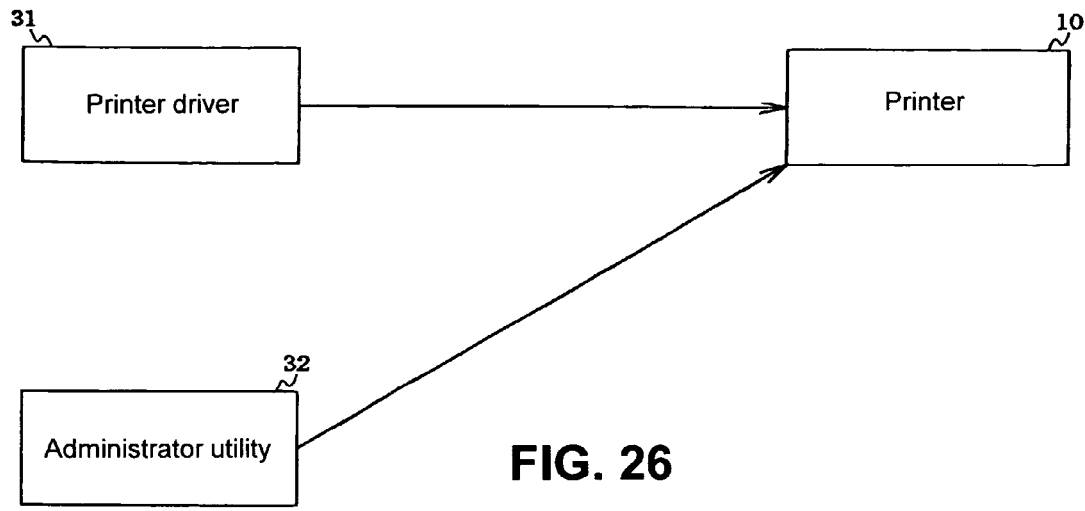
FIG. 26 is a block diagram showing a configuration of a system according to an eighth embodiment of the present invention.
Figure 27:
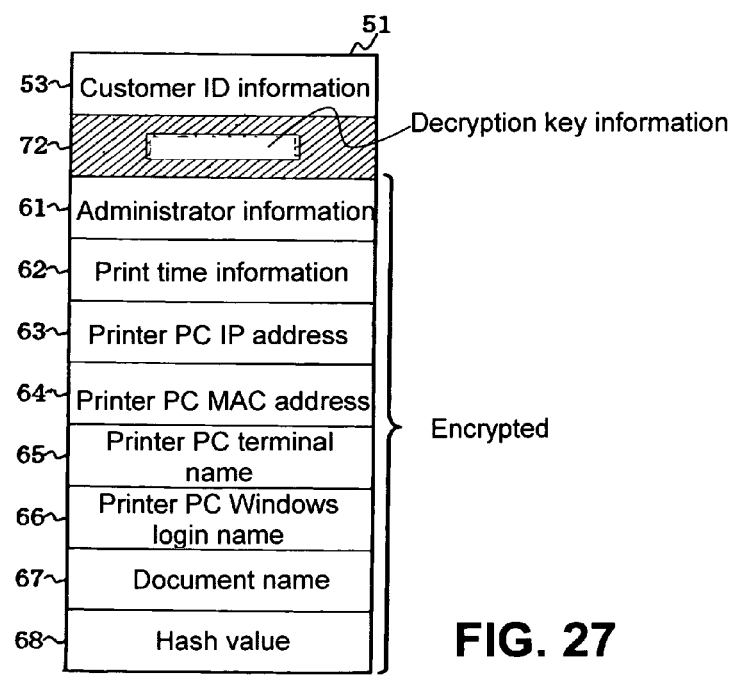
FIG. 27 is a schematic view showing a configuration of origination information according to the eighth embodiment of the present invention.

FIG. 26 is a block diagram showing a configuration of a system according to the eighth embodiment of the present invention. FIG. 27 is a schematic view showing a configuration of the origination information 51 according to the eighth embodiment of the present invention.

In the fifth to seventh embodiments, the PJL command text string, i.e., the text string used for generating the decryption key, is fixed. In the eighth embodiment, the printer driver 31, i.e., the encrypting side, can freely select the PJL command text string. In this case, similar to the fifth to seventh embodiments, a selectable text string is the text string of the document name 67, the print time information 62, or the printer PC Windows login name 66.

As shown in FIG. 26, the printer driver 31 sends the origination information 51 to the printer 10 as a part of the job information 50. Note that the origination information 51 is encrypted with the printer driver 31, and the printer driver 31 randomly selects the encryption key.

In the embodiment, the encryption key selected with the printer driver 31 is stored in decryption key information 72 in the origination information 51. Accordingly, the printer 10 refers to the decryption key information 72 to obtain the decryption key. Further, the decryption key information 72 includes information regarding which of the PJL command text string in the document name 67, the print time information 62, or the printer PC Windows login name 66 is to be used as the decryption key.

Figure 28:
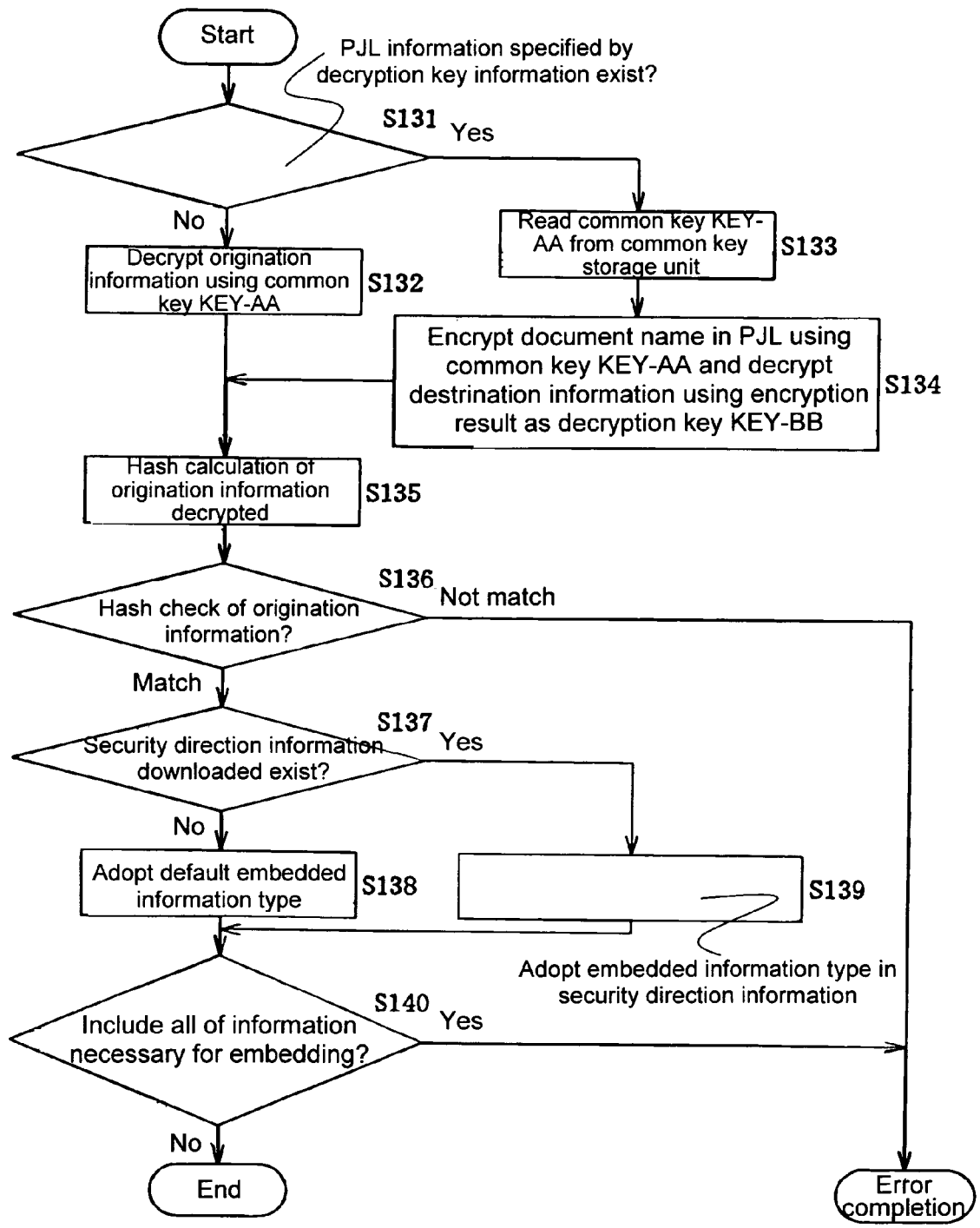
FIG. 28 is a flowchart showing an operation of an origination information decryption unit of a printer according to the eighth embodiment of the present invention.

An operation of the origination information decryption unit 13 will be explained next. FIG. 28 is a flowchart showing the operation of the origination information decryption unit 13 of the printer 10 according to the eighth embodiment of the present invention.

In the embodiment, first, the origination information decryption unit 13 determines whether there is PJL information specified by the decryption key information 72, and determines whether there is the PJL command text string specified by the decryption key information 72. When there is the PJL command text string specified by the decryption key information 72, the origination information decryption unit 13 reads the common key KEY-AA from the common key storage unit 26a. Then, the origination information decryption unit 13 retrieves the PJL command text string specified by the decryption key information 72, i.e., the information in the PJL command, and encrypts the PJL command text string specified by the decryption key information 72 using the common key KEY-AA. Then, the origination information decryption unit 13 converts the encryption result to the decryption key KEY-BB, and decrypts the origination information 51 using the decryption key KEY-BB.

When there is not the PJL command text string specified by the decryption key information 72, the origination information decryption unit 13 decrypts the origination information 51 using the common key KEY-AA. In decryption, the AES is used as the algorism for decryption.

In the next step, the origination information decryption unit 13 performs the hash calculation of the origination information 51 thus decrypted. The hash calculation is performed using the SHA-1 hash function.

In the next step, the origination information decryption unit 13 performs the hash check on the origination information 51 thus decrypted, and compares the hash value generated in the hash function with the hash value 68 included in the origination information 51 to determine whether the hash value matches to the hash value 68. When the hash value does not match to the hash value 68, the origination information decryption unit 13 performs the error return or the error completion. When the hash value matches to the hash value 68, the origination information decryption unit 13 determines whether the security direction information 35 thus downloaded exists. When there is not the security direction information 35 thus downloaded, the origination information decryption unit 13 adopts the default embedded information type. When there is the security direction information 35 thus downloaded, the origination information decryption unit 13 adopts the embedded information type in the security direction information 35.

In the next step, the origination information decryption unit 13 determines whether the origination information 51 includes all of the information necessary for embedding, that is, there is sufficient information necessary for embedding. When there is not sufficient information necessary for embedding, the origination information decryption unit 13 performs the error return or the error completion. When there is sufficient information necessary for embedding, the origination information decryption unit 13 completes the process normally.

The flowchart shown in FIG. 28 will be explained next. In step S131, it is determined whether there is the PJL information specified by the decryption key information 72. When there is the PJL information specified by the decryption key information 72, the process proceeds to step S133. When there is not the PJL information specified by the decryption key information 72, the process proceeds to step S132.

In step S132, the origination information 51 is decrypted using the common key KEY-AA. In step S133, the common key KEY-AA is read from the common key storage unit 26a. In step S134, the PJL information specified by the decryption key information 72 is retrieved and is encrypted using the common key KEY-AA. Then, the encryption result is converted to the decryption key KEY-BB, thereby decrypting the origination information 51.

In step S135, the hash calculation is performed on the origination information 51 thus decrypted. In step S136, it is determined whether the hash check of the origination information 51 thus decrypted is matched. When the hash check of the origination information 51 thus decrypted is matched, the process proceeds to step S137. When the hash check of the origination information 51 thus decrypted is not matched, the error completion is performed.

In step S137, it is determined whether the security direction information 35 thus downloaded exists. When the security direction information 35 thus downloaded exists, the process proceeds to step S139. When the security direction information 35 thus downloaded does not exist, the process proceeds to step S138.

In step S138, the default embedded information type is adopted. In step S139, the embedded information type in the security direction information 35 is adopted. In step S140, it is determined whether the origination information 51 includes all of the information necessary for embedding. When the origination information 51 includes all of the information necessary for embedding, the process is completed. When the origination information 51 does not include all of the information necessary for embedding, the error completion is performed.

As described above, in the embodiment, the printer driver 31, i.e., the encrypting side, selects the encryption key of the origination information 51. Accordingly, as compared with the case of using the fixed encryption key, it is possible to prevent the encryption key from being easily stolen.

In the embodiment, the PJL command text string used as the encryption key is the text string of the document name 67, the print time information 62, or the printer PC Windows login name 66. As far as the information sent to the printer 10 is related to the printing operation such as the PJL, any information can be used as the encryption key.

In the first to eighth embodiments, the method of embedding into the print image of the origination information 51 is not limited to those explained above. Any types such as text information, a bar code, and the likes, that is recognizable to a human, can be used, as far as the origination information 51 can be retrieved. Further, the method of generating the encryption key, the encryption algorism, the encryption method, and the likes are not limited those described above, and any types can be used.

The disclosure of Japanese Patent Application No. 2007-052914, filed on Mar. 2, 2007 is incorporated in the application by reference.

While the invention has been explained with reference to the specific embodiments of the invention, the explanation is illustrative and the invention is limited only by the appended claims.

What is claimed is:

1. An image forming apparatus, comprising:
   a receiving unit configured to receive first data encrypted with a first encryption method and second data not encrypted;
   a decryption unit configred to encrypt specific information contained in the second data to create a decryption key and decrypt the first data thus encrypted using the decryption key;
   an embedded data generation unit configured to re-edit the first data thus decrypted to generate embedded information;
   an embedded information encryption unit configured to encrypt the embedded information with a second encryption method; and
   an image forming unit configured to form the embedded information thus encrypted on a medium as a base emblem pattern.

2. The image forming apparatus according to claim 1, wherein said embedded information encryption unit is adapted to encrypt the embedded information with the second encryption method using a first encryption key encrypted with a third encryption method.

3. The image forming apparatus according to claim 1, wherein said receiving unit is adapted to receive the first data encrypted with the first encryption method using a second encryption key encrypted with a fourth encryption method.

4. The image forming apparatus according to claim 1, wherein said receiving unit is adapted to receive the first data encrypted with the first encryption method using the second encryption key encrypted with the fourth encryption method using a third encryption key encrypted based on a print time.

5. The image forming apparatus according to claim 1, wherein said embedded data generation unit generates the embedded information including origination information of the host device, or origination information of the image forming apparatus.

6. The image forming apparatus according to claim 1, wherein said decryption unit is adapted to decrypt the first data using a customer ID as the specific information.

7. The image forming apparatus according to claim 1, wherein said decryption unit is adapted to decrypt the first data using a document name as the specific information.

8. The image forming apparatus according to claim 1, wherein said decryption unit is adapted to decrypt the first data using a print time as the specific information.

9. The image forming apparatus according to claim 1, wherein said decryption unit is adapted to decrypt the first data using a log-on time as the specific information.

10. The image forming apparatus according to claim 1, further comprising a base emblem pattern generation unit configured to change the embedded information embedded into the base emblem pattern according to a security level of the first data.

11. The image forming apparatus according to claim 1, further comprising an origination information decryption unit configured encrypt or decrypt an origination using a key changed regularly.

* * * * *